(12) United States Patent
Liu

(10) Patent No.: US 12,293,104 B2
(45) Date of Patent: May 6, 2025

(54) CROSS-BLOCKCHAIN DATA MIGRATION

(71) Applicant: Tencent Technology (Shenzhen) Company Limited, Guangdong (CN)

(72) Inventor: Pan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 508 days.

(21) Appl. No.: 17/715,746

(22) Filed: Apr. 7, 2022

(65) Prior Publication Data

US 2022/0229577 A1 Jul. 21, 2022

Related U.S. Application Data

(63) Continuation of application No. PCT/CN2020/128098, filed on Nov. 11, 2020.

(30) Foreign Application Priority Data

Mar. 13, 2020 (CN) .......................... 202010179351.9

(51) Int. Cl.
*G06F 3/06* (2006.01)
*H04L 9/00* (2022.01)

(52) U.S. Cl.
CPC .......... *G06F 3/0647* (2013.01); *G06F 3/0673* (2013.01); *H04L 9/50* (2022.05)

(58) Field of Classification Search
CPC ...... G06F 21/64; G06F 3/0647; G06F 3/0604; G06F 3/0673; H04L 9/50

(Continued)

(56) References Cited

U.S. PATENT DOCUMENTS 10,204,148 B2 * 2/2019 Madisetti .............. H04L 9/0637
10,671,315 B2 * 6/2020 Sanghvi .............. G06F 16/2255
(Continued)

FOREIGN PATENT DOCUMENTS

CN 107577427 A 1/2018
CN 108170740 A 6/2018
(Continued)

OTHER PUBLICATIONS

Chinese Office Action for corresponding CN202010179351.9, issued Feb. 22, 2021, 14 pages, English translation included.
(Continued)

*Primary Examiner* — Amare F Tabor
(74) *Attorney, Agent, or Firm* — ArentFox Schiff LLP

(57) ABSTRACT

A cross-blockchain data migration method includes obtaining, by a first node in a first blockchain network, from a first blockchain in the first blockchain network, first service data information corresponding to a first data structure mode stored in a first block in the first blockchain and obtaining a second data structure mode associated with a second block in a second blockchain corresponding to a second blockchain network. The method further includes converting the first service data information to second service data information corresponding to the second data structure mode and establishing a hash mapping relationship between the first service data information and the second service data information in the first blockchain. The method also includes migrating the second service data information to a second node in the second blockchain network based on the hash mapping relationship.

20 Claims, 13 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 11,157,247 | B2 * | 10/2021 | Singi | H04L 9/0637 |
| 11,201,747 | B2 * | 12/2021 | Scherrer | H04L 9/3242 |
| 11,294,881 | B2 * | 4/2022 | Tian | G06F 3/0604 |
| 11,374,739 | B2 * | 6/2022 | Huang | H04L 9/3242 |
| 11,388,010 | B2 * | 7/2022 | Chen | G06F 9/542 |
| 11,429,956 | B2 * | 8/2022 | Bartolucci | H04L 9/50 |
| 11,431,561 | B2 * | 8/2022 | Smith | H04L 69/22 |
| 11,481,740 | B1 * | 10/2022 | Todd | G06Q 20/223 |
| 2019/0057386 | A1 | 2/2019 | Fazeli et al. | |

FOREIGN PATENT DOCUMENTS

| | | | |
|---|---|---|---|
| CN | 108829350 | A | 11/2018 |
| CN | 110134668 | A | 8/2019 |
| CN | 110704196 | A | 1/2020 |
| CN | 110706113 | A | 1/2020 |
| CN | 110717762 | A | 1/2020 |
| CN | 111309711 | A | 6/2020 |
| CN | 111813739 | A | 10/2020 |

OTHER PUBLICATIONS

International Search Report and Written Opinion for PCT/CN2020/128098, issued Feb. 18, 2021, 13 pages, English translation included.

\* cited by examiner

CROSS-BLOCKCHAIN DATA MIGRATION

RELATED APPLICATIONS

This application is a continuation of International Application No. PCT/CN2020/128098, filed on Nov. 11, 2020, which claims priority to Chinese Patent Application No. 202010179351.9, entitled "CROSS-BLOCKCHAIN DATA MIGRATION METHOD, APPARATUS, DEVICE, AND STORAGE MEDIUM" and filed on Mar. 13, 2020.

The entire disclosures of the prior applications are hereby incorporated by reference.

FIELD OF THE TECHNOLOGY

This application relates to the field of blockchain technologies, including a blockchain-based data migration method, apparatus, device, and non-transitory storage medium.

BACKGROUND OF THE DISCLOSURE

At present, blockchains may become heterogeneous chains due to an upgrade of the version or an adjustment of the technical architecture (for example, a blockchain 1 and a blockchain 2 are heterogeneous blockchains). In this case, ledger data in blockchain 1 needs to be migrated to blockchain 2. At present, the process of migrating the ledger data in the blockchain 1 to the blockchain 2 requires the participation of a third-party service organization recognized by both the blockchain 1 and the blockchain 2, where the ledger data on the blockchain 1 is migrated to the third-party service organization, and the third-party service organization migrates the ledger data to the blockchain 2. As a result, the process of migrating the ledger data needs to rely on the third-party service organization.

SUMMARY

Embodiments of this disclosure provide a cross-blockchain data migration method, apparatus, device, and non-transitory storage medium, which can improve data migration efficiency and increase the security of migrated data.

In an embodiment, a cross-blockchain data migration method includes obtaining, by a first node in a first blockchain network, from a first blockchain in the first blockchain network, first service data information corresponding to a first data structure mode stored in a first block in the first blockchain and obtaining a second data structure mode associated with a second block in a second blockchain corresponding to a second blockchain network. The method further includes converting the first service data information to second service data information corresponding to the second data structure mode and establishing a hash mapping relationship between the first service data information and the second service data information in the first blockchain. The method also includes migrating the second service data information to a second node in the second blockchain network based on the hash mapping relationship.

In an embodiment, a cross-blockchain data migration method includes obtaining, by processing circuitry of a second node in a second blockchain network, a hash mapping relationship between first service data information corresponding to a first data structure mode and second service data information corresponding to a second data structure mode, the hash mapping relationship being established by a first node in a first blockchain network in a first blockchain, the first service data information being obtained by the first node from the first blockchain, the first data structure mode being determined by a data structure mode of the first service data information stored in a first block in the first blockchain, and the second service data information being determined by the first node by obtaining the second data structure mode associated with a second block in a second blockchain corresponding to the second blockchain network and converting the first service data information corresponding to the first data structure mode to the second data structure mode. The method further includes receiving, based on the hash mapping relationship, the second service data information migrated by the first node, and adding the second service data information to a transaction pool associated with the second blockchain, packing the second service data information into a to-be-verified block in the transaction pool, determining, according to the to-be-verified block, a target block to be written to the second blockchain, and writing the target block to the second blockchain.

In an embodiment, across-blockchain data migration apparatus includes processing circuitry of a first node in a first blockchain network, the processing circuitry being configured to obtain, from a first blockchain in the first blockchain network, first service data information corresponding to a first data structure mode stored in a first block in the first blockchain, and obtain a second data structure mode associated with a second block in a second blockchain corresponding to a second blockchain network, and convert the first service data information to second service data information corresponding to the second data structure mode. The processing circuitry is further configured to establish a hash mapping relationship between the first service data information and the second service data information in the first blockchain and migrate the second service data information to a second node in the second blockchain network based on the hash mapping relationship.

In the embodiments of this disclosure, a first node in a first blockchain network may convert first service data information corresponding to a first data structure mode into second service data information corresponding to a second data structure mode and establish a hash mapping relationship between the first service data information and the second service data information, so that the second service data information can be quickly found. In addition, the first node may further migrate the second service data information to a second node based on the hash mapping relationship. Whereby, the data migration efficiency can be improved and the security of migrated data can be increased.

BRIEF DESCRIPTION OF THE DRAWINGS

To describe the technical solutions of the embodiments of this disclosure, the following briefly introduces the accompanying drawings describing the embodiments or the related technology. The accompanying drawings in the following description show some embodiments of this disclosure, and a person skilled in the art may still derive other drawings from these accompanying drawings.

DESCRIPTION OF EMBODIMENTS

The technical solutions in embodiments of this disclosure are described in the following with reference to the accompanying drawings in the embodiments of this disclosure. The described embodiments are merely some rather than all of the embodiments of this disclosure. All other embodiments obtained by a person of ordinary skill in the art based on the embodiments of this disclosure shall fall within the scope of this disclosure.

As mentioned above, some ledger data migration methods need to rely on a third-party service organization, resulting in low efficiency of the data migration, and may be limited by the credit issues of the third-party service organization, resulting in low data security. Therefore, the embodiments of this disclosure provide a cross-blockchain data migration method, apparatus, device, and storage medium, which can improve the data migration efficiency and increase the security of migrated data.

Figure 1:
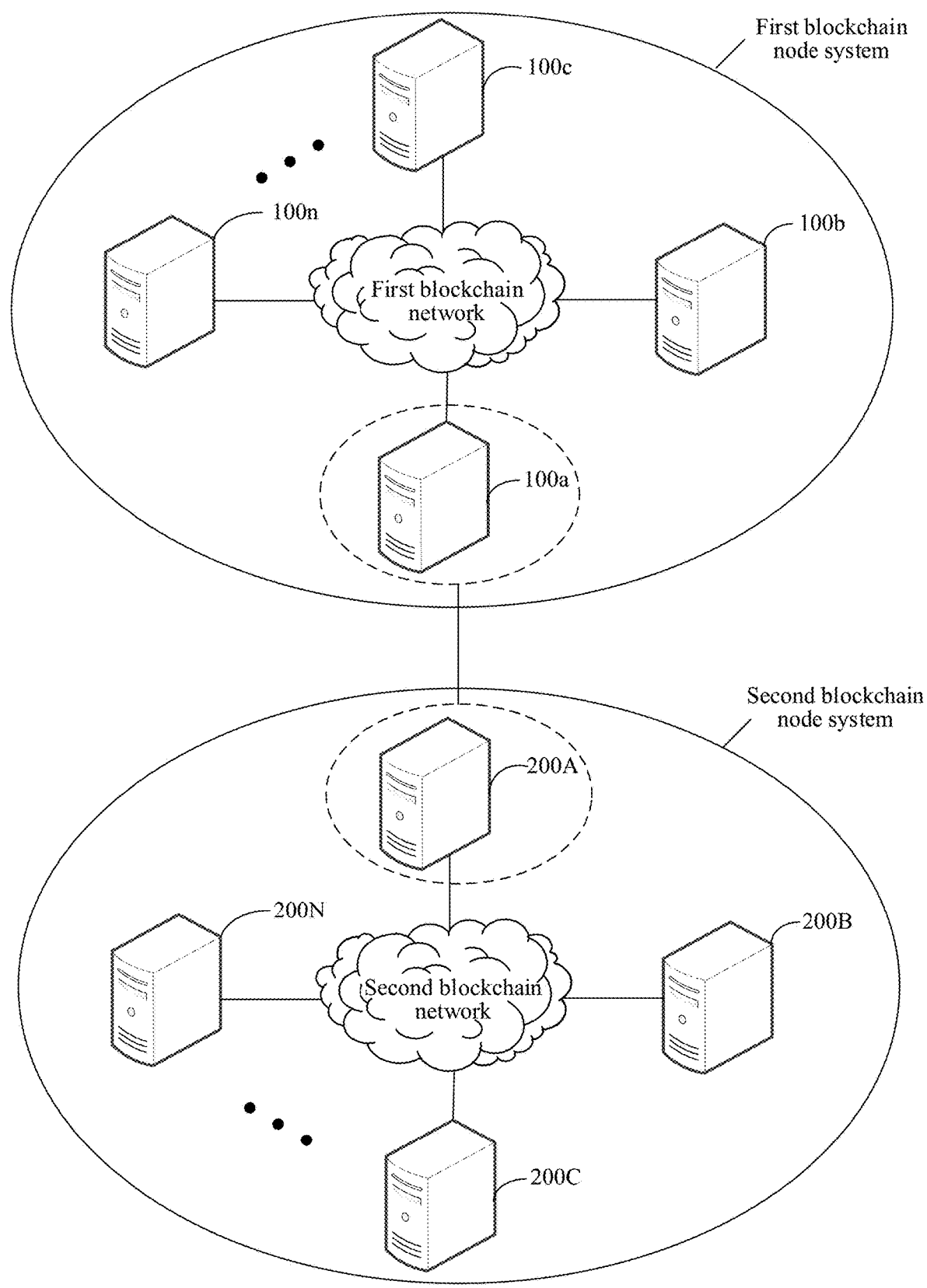
FIG. 1 is a schematic structural diagram of a network architecture according to an embodiment of this disclosure.

FIG. 1 is a schematic structural diagram of a network architecture according to an embodiment of this disclosure. As shown in FIG. 1, the network architecture may include a first blockchain node system configured to run a first blockchain network and a second blockchain node system configured to run a second blockchain network. A blockchain corresponding to the first blockchain network may be a first blockchain, and a blockchain corresponding to the second blockchain network may be a second blockchain. It is to be understood that a blockchain node system (the first blockchain node system or the second blockchain node system) may refer to a system for sharing data between nodes, and the blockchain node system may include a plurality of nodes. The nodes may be, for example, various computer devices.

As shown in FIG. 1, the first blockchain node system may specifically include a node 100a, a node 100b, a node 100c, . . . , and a node 100n. The second blockchain node system may specifically include a node 200A, a node 200B, a node 200C, . . . , and a node 200N.

In the blockchain node system (the first blockchain node system or the second blockchain node system), each node can maintain shared data in the blockchain node system during normal operation. To ensure the interchange of information in the blockchain node system (the first blockchain node system or the second blockchain node system), the nodes in the blockchain node system may establish a network connection with each other and transmit data through the network connection. For example, when any node in the second blockchain node system (for example, a second node, such as 200A) obtains second service data information, the other nodes in the second blockchain node system can obtain the second service data information according to a consensus algorithm, and store the second service data information as data in the shared data, so that all the nodes in the second blockchain node system store the same data.

Each node in the blockchain node system (the first blockchain node system or the second blockchain node system) has a corresponding node identifier. Each node in the blockchain node system may store node identifiers of other nodes in the blockchain node system that have a network connection relationship with the current node, so that subsequently the node can broadcast a generated block to the other nodes in the blockchain node system according to the node identifiers of the other nodes. Each node may maintain a node identifier list as shown in Table 1 below, and node names and node identifiers are correspondingly stored in the node identifier list. The node identifier may be an Internet Protocol (IP) address and any other type of information that can be used to identify the node device. Table 1 uses the IP address as an example for description only.

TABLE 1

| Node name | Node identifier |
| --- | --- |
| Node 1 | 117.114.151.174 |
| Node 2 | 117.116.189.145 |
| . . . | . . . |
| Node N | 119.123.789.258 |

Currently, types of blockchains may include: a public blockchain, a private blockchain, or a consortium blockchain. The public blockchain is a blockchain that is open to the public and can be joined and accessed by any person. Blocks on the public blockchain can be viewed by any person, any person can initiate transactions on the public blockchain and can participate in a consensus process of the public blockchain at any time. The private blockchain is a blockchain that can be used within a private organization, where read and write permissions and a permission to participate in accounting are specified according to rules of the private organization. The private blockchain is usually used for data management, auditing, etc. within an enterprise. The consortium chain is a blockchain that can be joined only by consortium members, where read and write permissions and a permission to participate in accounting are specified according to rules of a consortium. The consortium blockchain is generally used for inter-institutional transaction, settlement or clearing scenarios. It is to be understood that two different types of blockchains may have their own specifications. For example, a consensus mechanism in the public blockchain is generally Proof of Work (PoW) or Proof of Stake (PoS), while a consensus mechanism in the consortium blockchain is generally a Proof of Stake, Practical Byzantine Fault Tolerant (PBFT), or RAFT consensus algorithm. It is to be understood that two blockchains of the same type also have differences in their respective management specifications. For example, for two consortium blockchains, the consensus mechanism of one consortium blockchain may be Proof of Stake, and the consensus mechanism of the other consortium blockchain may be a PBFT consensus mechanism.

It is to be understood that the cross-chain interaction may be classified into two types, namely, interaction across homogeneous blockchains and interaction across heterogeneous blockchains, according to different underlying technology platforms of the blockchains. Because homogeneous blockchains may have the same security mechanism, consensus algorithm, network topology, and block generation and verification logic, the interaction across homogeneous blockchains is relatively simple. Heterogeneous chains differ greatly in the composition form of blocks and the deterministic guarantee mechanism, indicating that the cross-chain interaction between heterogeneous chains is relatively complex. For example, Bitcoin adopts the PoW algorithm, while the consortium blockchain Fabric adopts a traditional deterministic consensus algorithm, i.e., the blockchain corresponding to Bitcoin and the consortium blockchain Fabric are heterogeneous chains.

It can be understood that in the embodiments of this disclosure, one node may be selected from the first blockchain node system shown in FIG. 1 as a first node in the first blockchain network. For example, in the embodiments of this disclosure, the node 100a in the first blockchain node system may be used as the first node in the first blockchain network. It can be understood that in the embodiments of this disclosure, one node may be selected from the second blockchain node system shown in FIG. 1 as a second node in the second blockchain network. For example, in the embodiments of this disclosure, the node 200A in the second blockchain node system may be used as the second node. It is to be understood that the first blockchain and the second blockchain may be heterogeneous chains. In the embodiments of this disclosure, heterogeneous chains may be blockchains with different modes. The first blockchain and the second blockchain may be blockchains of the same type. For example, the first blockchain may be a consortium chain, and the second blockchain may also be a consortium chain. The first blockchain and the second blockchain may also be different types of blockchains. For example, the first blockchain may be a consortium blockchain, and the second blockchain may also be a consortium blockchain. It is to be understood that the first blockchain in the embodiments of this disclosure may become the second blockchain due to the upgrade of the version or the adjustment of the technical architecture. In this case, the node 100a needs to migrate service data information (i.e., ledger data) in the first blockchain to the second blockchain.

It is to be understood that the node 100a in the first blockchain network may obtain first service data information corresponding to a first data structure mode from a first blockchain corresponding to the first blockchain network, the first data structure mode being determined by a data structure mode of the first service data information stored in a first block in the first blockchain. In the embodiments of this disclosure, the data structure mode of the service data information in the first block may be referred to as the first mode. For example, the first mode may be an Unspent Transaction Outputs (UTXO) mode or an account/balance mode. It is to be understood that the first block may be any one of all blocks in the first blockchain.

For ease of understanding, the embodiments of this disclosure take a bitcoin wallet as an example to illustrate that the first data structure mode is the UTXO mode. A user (for example, a target user) may have multiple bitcoin addresses, and each bitcoin address can have a corresponding UTXO value. In this case, the value of the balance in the bitcoin wallet is the sum of the UTXO values in all the addresses in the bitcoin wallet. For example, if user A receives 1 bitcoin (transferred by user B or mined by user A), the UTXO value in the bitcoin address corresponding to user A increases by 1, that is, the total amount in the bitcoin wallet increases by 1.

For ease of understanding, the embodiments of this disclosure take an Ethereum wallet as an example to illustrate that the first data structure mode is the account/balance mode. An account of a user (for example, an account of a target user) may have a certain balance. When the target user as a transaction initiator needs to initiate a transaction, the transaction is valid once the balance in the account of the target user is sufficient to pay a transaction fee of the transaction. In this case, the balance in the user account of the transaction initiator is deducted by the corresponding amount (that is, the transaction fee), and the amount (that is, the transaction fee) is credited to the user account of the transaction recipient.

It can be understood that the first service data information may be a trial result of a certain case and evidence materials provided during the trial in a judicial scenario, which are inputted by a user terminal associated with the node 100a. The first service data information may also be logistics information indicating that an express delivery arrives at a designated area, which is certified by a user terminal associated with the node 100a by scanning a two-dimensional code in an express logistics scenario. The first service data information may also be purchase and consumption records of game currency by a user terminal associated with the node 100a in a game scenario. The user terminal associated with the node 100a may be a smart terminal with a service data processing function, such as a smart phone, a tablet computer, or a desktop computer. The first service data information may also be process information such as billing, circulation, entry, reimbursement, etc. of an electronic bill associated with the node 100a in an electronic bill processing scenario. The examples will not be enumerated herein.

Further, the node 100a in the first blockchain network may obtain a second data structure mode associated with a second block on a second blockchain corresponding to a second blockchain network and convert the first service data information corresponding to the first data structure mode to second service data information corresponding to the second data structure mode. The second mode may be different from the first mode. In the embodiments of this disclosure, the data structure mode of the service data information in the second block may be referred to as the second mode. It is to be understood that the first service data information and the second service data information may be service data information having different data structure modes.

Further, the node 100a in the first blockchain network may establish a hash mapping relationship between the first service data information and the second service data information in the first blockchain. It is to be understood that the node 100a may respectively perform a hash operation on the first service data information and the second service data information by using a hash algorithm to obtain a first hash value corresponding to the first service data information and a second hash value corresponding to the second service data information. In this case, the node 100a may establish a hash mapping relationship between the first hash value corresponding to the first service data information and the second hash value corresponding to the second service data information in the first blockchain. In the embodiments of this disclosure, a correspondence between the first hash value corresponding to the first service data information and the second hash value corresponding to the second service data information may be referred to as a hash mapping relationship.

Further, the node 200A in the second blockchain network may obtain, from the first blockchain corresponding to the first blockchain network, a hash mapping relationship that is established by the first node in the first blockchain network between the first hash value corresponding to the first service data information and the second hash value corresponding to the second service data information.

Further, the node 100a in the first blockchain network may migrate the second service data information to the node 200A in the second blockchain network based on the hash mapping relationship. In this case, the node 200A in the second blockchain network may receive, based on the hash mapping relationship, the second service data information migrated by the node 100a. Further, the node 200A in the second blockchain network may add the second service data information to a transaction pool associated with the second blockchain, and write a target block including the second service data information into the second blockchain. The transaction pool associated with the second blockchain may receive the second service data information, and perform a parameter and service validity check on the second service data information before the second service data information is packed into a to-be-verified block. The target block may be a block with a largest timestamp in the second blockchain. It can be seen that the embodiments of this disclosure can realize the migration of service data information between the first blockchain and the second blockchain, improve the efficiency of data migration, and increase the security of migrated data.

Figure 2:
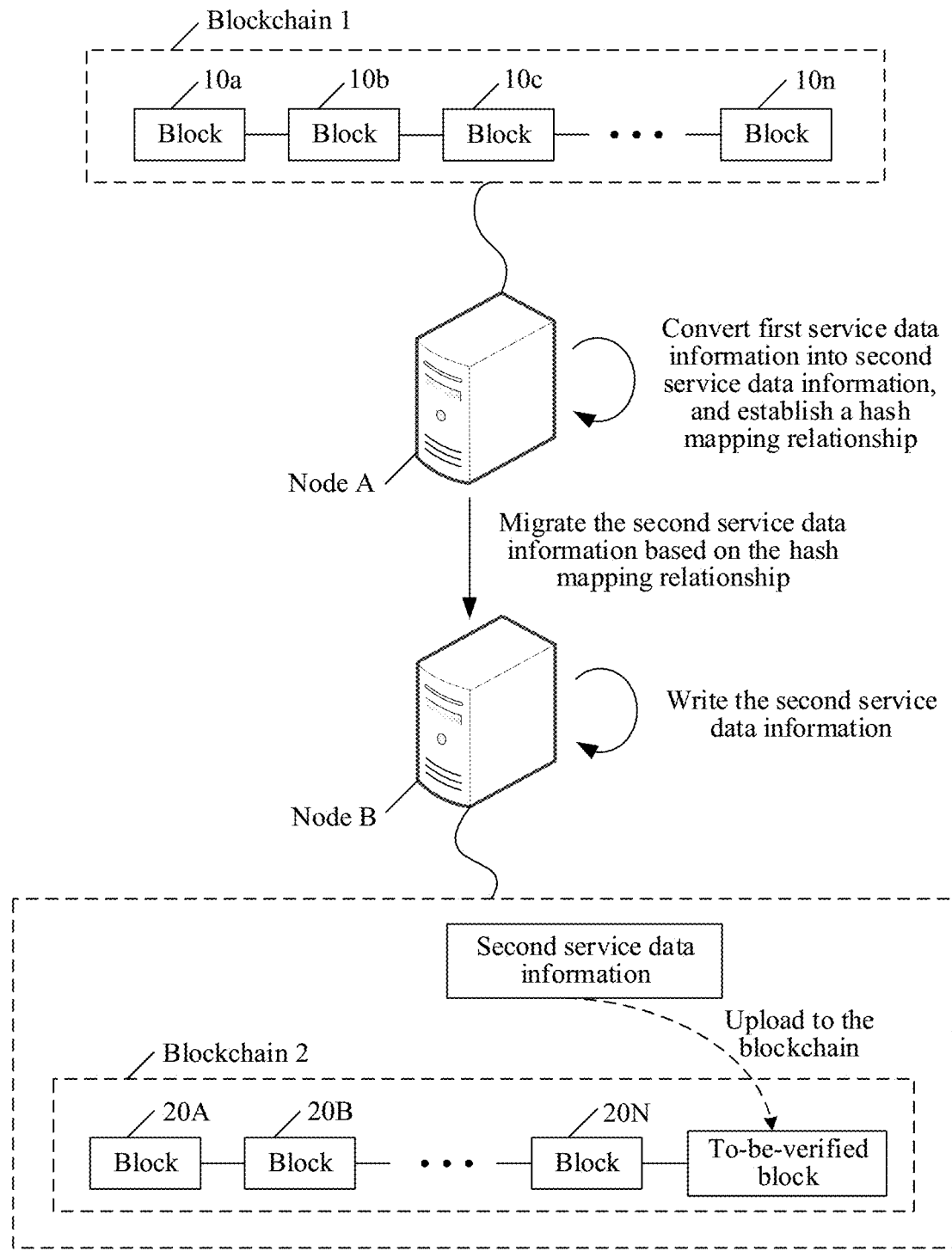
FIG. 2 is a schematic diagram of a data migration scenario according to an embodiment of this disclosure.

For ease of understanding, FIG. 2 is a schematic diagram of a data migration scenario according to an embodiment of this disclosure. As shown in FIG. 2, in this embodiment of this disclosure, node A may be a first node in a first blockchain network, and the first node in the first blockchain network may be the node 100a in the first blockchain node system shown in FIG. 1. In this embodiment of this disclosure, node B may be a second node in a second blockchain network, and the second node in the second blockchain network may be the node 200A in the second blockchain node system shown in FIG. 1.

It can be understood that the blockchain 1 shown in FIG. 2 may be the first blockchain corresponding to the first blockchain network in FIG. 1, the blockchain 1 may be the same blockchain shared by each node in the first blockchain network corresponding to the node A, and in the blockchain 1, each node may obtain information stored in the first blockchain. The blockchain 1 may include a block 10a, a block 10b, a block 10c, ..., a block 10n. The block 10a may be referred to as a genesis block of the blockchain 1.

It can be understood that the blockchain 2 shown in FIG. 2 may be the second blockchain corresponding to the second blockchain network in FIG. 1, the blockchain 2 may be the same blockchain shared by each node in the second blockchain network corresponding to the node B, and in the second blockchain, each node may obtain information stored in the blockchain 2. The blockchain 2 may include a block 20A, a block 20B, ..., a block 20N, and a target block. The block 20A may be referred to as a genesis block of the blockchain 2. The target block in the blockchain 2 may include second service data information. Also, the target block may be a block with a largest timestamp on the blockchain 2.

It can be understood that the blockchain 1 (i.e., the first blockchain) and the blockchain 2 (i.e., the second blockchain) may be heterogeneous blockchains. In the embodiments of this disclosure, heterogeneous chains may be blockchains with different data structure modes. The blockchain 1 and the blockchain 2 may be blockchains of the same type. For example, the blockchain 1 may be a public blockchain (e.g., Bitcoin blockchain), and the blockchain 2 may also be a public blockchain (e.g., Ethereum blockchain). The blockchain 1 and the blockchain 2 may also be blockchains of different types. For example, the blockchain 1 may be a private blockchain, and blockchain 2 may be a consortium blockchain.

In the embodiments of this disclosure, the blockchain 1 (i.e., the first blockchain) may become the blockchain 2 (i.e., the second blockchain) due to an upgrade or an adjustment of the technical architecture. In this case, the node A needs to migrate service data information (i.e., ledger data) on the blockchain 1 (i.e., the first blockchain) to the blockchain 2 (i.e., the second blockchain).

It is to be understood that the node A may obtain first service data information corresponding to a first data structure mode from a first block in the first blockchain. In other words, the node A may obtain first service data information corresponding to a first data structure mode from a first block in the blockchain 1. The first block may be any one of all blocks in the blockchain 1. For example, the first block may be the block 10c. The first mode being determined by a data structure mode of the first service data information stored in the first block on the blockchain 1. For example, if the blockchain 1 is a Bitcoin blockchain, the first mode may be a UTXO mode, that is, the first service data information may be service data information having the UTXO mode; if the blockchain 1 is an Ethereum blockchain, the first mode may be an account/balance mode, that is, the first service data information may be service data information having the account/balance mode.

Further, after obtaining the first service data information, the node A may obtain a second data structure mode associated with a second block in the second blockchain corresponding to the second blockchain network. In other words, the node A may obtain a second mode associated with a second block on the blockchain 2. It is to be understood that node A may obtain, according to the node B having a network connection relationship with the node A, a data structure mode of the service data information in the second block on the blockchain 2 corresponding to the second blockchain network to which the node B belongs. Further, the node A may use the data structure mode of the service data information in the second block as the second mode. The second mode may be different from the first mode. For example, if the blockchain 1 is a Bitcoin blockchain, the first mode may be the UTXO mode; If the blockchain 2 is an Ethereum blockchain, the second mode may be the account/balance mode. Further, because the first mode is different from the second mode, the node A needs to convert the first service data information corresponding to the first mode to second service data information corresponding to the second mode. In other words, after the node A converts the first service data information to the second service data information, the node B can receive the second service data information. For example, if the first mode is the UTXO mode and the second mode is the account/balance mode, the node A needs to convert the first service data information corresponding to the UTXO mode (for example, the user's historical transaction data or digital assets) into second service data information corresponding to the account/balance mode.

Further, the node A may establish a hash mapping relationship between the first service data information and the second service data information on the blockchain 1. Specifically, the node A may perform a hash operation on the first service data information according to a hash algorithm to obtain a first hash value corresponding to the first service data information; and perform a hash operation on the second service data information according to the hash algorithm to obtain a second hash value corresponding to the second service data information. The hash algorithm may be a secure hash algorithm (SHA). Secure hash algorithms are a family of cryptographic hash functions published by the National Institute of Standards and Technology (NIST) as a U.S. Federal Information Processing Standard (FIPS). The secure hash algorithm is an algorithm for calculating a character string of a fixed length (also known as a message digest, e.g., the first hash value or the second hash value) corresponding to a digital message (e.g., the first service data information or the second service data information). SHAs can include SHA-1, SHA-224, SHA-256, SHA-384, and SHA-512. In this case, after obtaining the first hash value corresponding to the first service data information and the second hash value corresponding to the second service data information, the node A may establish a hash mapping relationship between the first hash value and the second hash value on the blockchain 1. For example, if the first service data corresponds to hash1 (that is, the first hash value) and the second service data corresponds to hash2 (that is, the second hash value), the hash mapping relationship can be a key-value pair (that is, hash1 corresponds to hash2), that is, hash2 can be found according to hash1. Further, the node B (that is, the second node) may obtain a hash mapping relationship that is established by the node A between the first hash value corresponding to the first service data information and the second hash value corresponding to the second service data information.

Further, the node A may migrate the second service data information to the node B (that is, the second node) in the second blockchain network based on the hash mapping relationship. The node B is configured to write a target block including the second service data information into the blockchain 2 after adding the second service data information to a transaction pool associated with the blockchain 2. The node B may receive, based on the hash mapping relationship, the second service data information migrated by the node A.

Further, the node B may add the second service data information to the transaction pool associated with the blockchain 2. The transaction pool associated with the blockchain 2 may receive the second service data information, and perform a parameter and service validity check on the second service data information before the second service data information is packed into a to-be-verified block. It is to be understood that after adding the second service data information to the transaction pool associated with the blockchain 2, the node B packs the second service data information into the to-be-verified block. The target block may include the second service data information. It can be understood that the node B may broadcast the to-be-verified block to all blockchain nodes in the blockchain 2 (e.g., consensus nodes for consensus processing), and when it is determined that all the blockchain nodes reach a consensus, generate the target block including the second service data information. It can be understood that the node B may add the target block to the above-mentioned blockchain 2, that is, use the target block as a block next to the block 20N. In the embodiments of this disclosure, by writing the second service data information into the blockchain 2, the authenticity of the second service data information can be ensured, to prevent malicious tampering by others.

It can be seen that in the embodiments of this disclosure, a first node in a first blockchain network may convert first service data information corresponding to a first mode into second service data information corresponding to a second mode, and establish a hash mapping relationship between the first service data information and the second service data information, so that the second service data information can be quickly found. In addition, the first node may further migrate the second service data information to a second node based on the hash mapping relationship. Whereby, the data migration efficiency can be improved and the security of migrated data can be increased.

For specific implementations of migrating the second service data information to the second node by the first node in the first blockchain network after converting the first service data information to the second service data information, reference may be made to the embodiments corresponding to FIG. 3 to FIG. 9 below.

Figure 3:
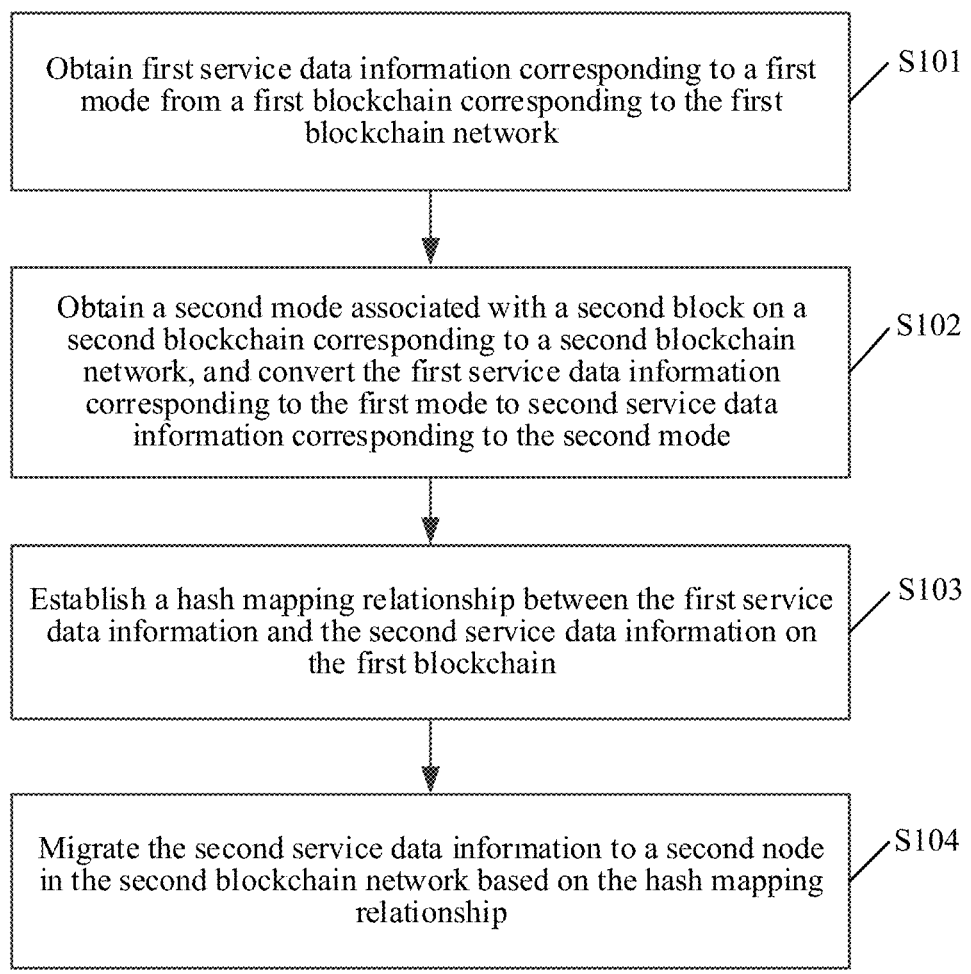
FIG. 3 is a schematic flowchart of a cross-blockchain data migration method according to an embodiment of this disclosure.

FIG. 3 is a schematic flowchart of a cross-blockchain data migration method according to an embodiment of this disclosure. As shown in FIG. 3, the method may be executed by a first node in a first blockchain network and include the following steps.

In step S101, first service data information corresponding to a first mode (e.g., a first data structure mode) is obtained from a first blockchain corresponding to the first blockchain network.

Specifically, the first node in the first blockchain may obtain the first service data information corresponding to the first data structure mode from the first blockchain corresponding to the first blockchain network, the first data structure mode being determined by a data structure mode of the first service data information stored in a first block in the first blockchain. The first service data information may include a plurality of pieces of service data information (for example, may include target service data information). In an embodiment, the first node may obtain key service data information from the first blockchain corresponding to the first blockchain network (for example, may obtain a part of service data information in ledger data in the first blockchain), where the obtained key service data information is collectively referred to as the first service data information.

The first service data information may be a trial result of a certain case and evidence materials provided during the trial in a judicial scenario, which are inputted by a user terminal associated with the first node. The first service data information may also be logistics information indicating that an express delivery arrives at a designated area, which is certified by a user terminal associated with the first node by scanning a two-dimensional code in an express logistics scenario. The first service data information may also be purchase and consumption records of game currency by a user terminal associated with the first node in a game scenario. The user terminal associated with the first node may be a smart terminal with a service data processing function, such as a smart phone, a tablet computer, or a desktop computer. The first service data information may also be process information such as billing, circulation, entry, reimbursement, etc. of an electronic bill associated with the first node in an electronic bill processing scenario. The examples will not be enumerated herein.

The first node in the embodiments of this disclosure may be the node A shown in FIG. 2, and the node A may also be the node 100a shown in FIG. 1. It is to be understood that in the embodiments of this disclosure, the data structure mode of the first service data information may be referred to as the first mode or the first data structure mode. For example, the first mode may be a UTXO mode or an account/balance mode. It is to be understood that the first block may be any one of all blocks in the first blockchain. For example, the first block may be any block (e.g., the block 10a) on the blockchain 1 (i.e., the first blockchain) shown in FIG. 2.

In step S102, a second mode (e.g., a second data structure mode) associated with a second block on a second blockchain corresponding to a second blockchain network is obtained, and the first service data information corresponding to the first mode is converted to second service data information corresponding to the second mode.

Specifically, the first node in the first blockchain network may obtain a second mode associated with a second block on a second blockchain corresponding to a second blockchain network and convert the first service data information corresponding to the first mode to second service data information corresponding to the second mode. The first blockchain and the second blockchain may be heterogeneous chains. In the embodiments of this disclosure, heterogeneous chains may be blockchains with different modes. The first blockchain and the second blockchain may be blockchains of the same type. For example, the first blockchain may be a public blockchain (e.g., Bitcoin blockchain), and the second blockchain may also be a public blockchain (e.g., Ethereum blockchain). The first blockchain and the second blockchain may also be blockchains of different types. For example, the first blockchain may be a private blockchain, and the second blockchain may be a consortium blockchain. It can be understood that because the first blockchain and the second blockchain are heterogeneous blockchains, the data structure mode of the service data information in the first blockchain is different from the data structure mode of the service data information in the second blockchain. In this case, the first node may obtain a data structure mode of service data information in the second block according to the second node having a network connection relationship with the first node. The second block may be a block in the second blockchain corresponding to the second blockchain network to which the second node belongs.

Further, the first node may use the data structure mode of the service data information in the second block as a second mode or a second data structure mode. The second mode may be different from the first mode, that is, the data structure mode of the service data information in the first block may be different from the data structure mode of the service data information in the second block. There may be no correlation between a block height of the first block in the first blockchain and a block height of the second block in the second blockchain. For example, the block height of the first block in the first blockchain may be H (e.g., H=105), and the block height of the second block in the second blockchain may be h (e.g., h=1024). A block height may refer to a distance (number of blocks) from a certain block to the first block in a blockchain, and the position of a certain block on the blockchain can be known from the block height. It is to be understood that the block height H in the embodiments of this disclosure may be greater than, equal to or less than the block height h, which is not limited herein.

The second mode may be the UTXO mode or the account/balance mode. For example, if the first blockchain is a Bitcoin blockchain, the first mode may be the UTXO mode; if the second blockchain is an Ethereum blockchain, the second mode may be the account/balance mode. Further, because the first mode is different from the second mode, the first node needs to convert the first service data information corresponding to the first mode to second service data information corresponding to the second mode.

Further, the first node may convert the data structure mode of the first service data information from the first mode to the second mode, and use the first service data information in the second mode as the second service data information. The second service data information may include a plurality of pieces of service data information. It can be understood that after the first node converts the first service data information to the second service data information, the second node can receive the second service data information. For example, if the first mode is the UTXO mode and the second mode is the account/balance mode, the first node needs to convert the first service data information corresponding to the UTXO mode (for example, the user's historical transaction data or digital assets) into second service data information corresponding to the account/balance mode.

In step S103, a hash mapping relationship is established between the first service data information and the second service data information in the first blockchain.

Specifically, the first node in the first blockchain network may establish a hash mapping relationship between the first service data information and the second service data information in the first blockchain. It can be understood that the first node may obtain a first hash value corresponding to the first service data information and a second hash value corresponding to the second service data information. In other words, the first node may perform a hash operation on the first service data information according to a hash algorithm to obtain a first hash value corresponding to the first service data information. In other words, the second node may perform a hash operation on the second service data information according to a hash algorithm to obtain a second hash value corresponding to the first service data information. The hash algorithm may include but is not limited to: SHA-1, SHA-224, SHA-256, SHA-384, and SHA-512.

Further, the first node may create an initial mapping relationship between the first hash value and the second hash value in the first blockchain and use the initial mapping relationship as the hash mapping relationship between the first service data information and the second service data information. In this case, the first node may further perform a hash operation on the second service data information according to a hash algorithm to obtain hash2 (i.e., a second hash value) corresponding to the first service data information. Further, the first node may establish a hash mapping relationship between hash1 (i.e., the first hash value) and hash2 (i.e., the second hash value) in the first blockchain. The hash mapping relationship may be a correspondence between hash1 and hash2. For example, the hash mapping relationship between hash1 and hash2 may exist in the form of a key-value pair, or may exist in the form of a list, which is not limited herein. The hash mapping relationship between the first service data information and the second service data information may specifically be as shown in Table 2.

TABLE 2

| First hash value | Second hash value |
|---|---|
| Hash value a | Hash value A |
| Hash value b | Hash value B |
| ... | ... |
| Hash value n | Hash value N |

As shown in Table 2, the first hash value may include hash value a, hash value b, hash value n, and the second hash value may include hash value A, hash value B, . . . , hash value N. There is an initial hash mapping relationship between the hash value a and the hash value A; there is an initial hash mapping relationship between the hash value b and the hash value B; . . . ; there is an initial hash mapping relationship between the hash value n and the hash value N. There is an initial hash mapping relationship between the first hash value and the second hash value in the first blockchain, and the initial mapping relationship may be as the hash mapping relationship between the first service data information and the second service data information.

In step S104, the second service data information is migrated to a second node in the second blockchain network based on the hash mapping relationship.

Specifically, the first node in the first blockchain network may migrate the second service data information to the second node in the second blockchain network based on the hash mapping relationship. The second node is configured to write a target block including the second service data information into the second blockchain after adding the second service data information to a transaction pool associated with the second blockchain. The second node in the embodiments of this disclosure may be the node B shown in FIG. 2, and the node B may also be the node 200A shown in FIG. 1.

Figure 4:
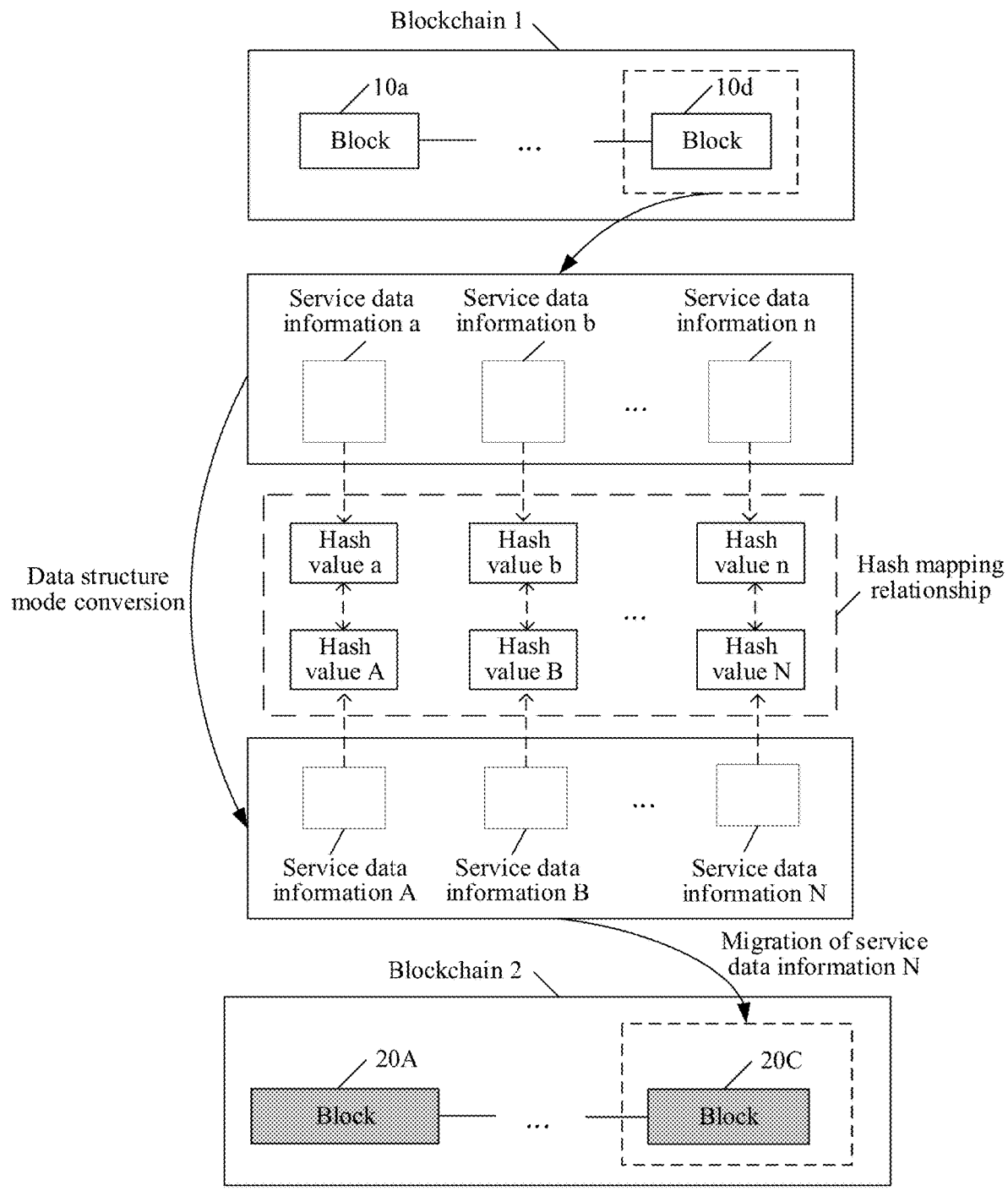
FIG. 4 is a schematic diagram showing a hash mapping relationship according to an embodiment of this disclosure.

For ease of understanding, FIG. 4 is a schematic diagram showing a hash mapping relationship according to an embodiment of this disclosure. As shown in FIG. 4, the blockchain 1 may be the first blockchain corresponding to the first blockchain network to which the first node belongs. The blockchain 1 may include block 10a, . . . , block 10d. The blockchain 1 may be the same blockchain shared by each node in the first blockchain network corresponding to the first node, and in the blockchain 1, each node may obtain information stored in the blockchain 1. The blockchain 2 may include block 20A, . . . , block 20C. It can be understood that the first block in the embodiments of this disclosure may be any block on the blockchain 1 (i.e., the first blockchain). The block 10d in the blockchain 1 is used as an example of the first block A herein to illustrate the specific process of migrating service data information (for example, second service data information) in the first blockchain. It is to be understood that the target block in the embodiments of this disclosure may be a block with a largest timestamp on the blockchain 2 (i.e., the second blockchain). The block 20C in the blockchain 2 is used as the target block to illustrate the process of migrating service data information (for example, the second service data information).

It can be understood that the block 10d may include first service data information (for example, service data information a, service data information b, . . . , service data information n, which may be transaction record information corresponding to the first data structure mode), the first node may obtain the first service data information from the block 10d, and convert the data structure mode of the first service data information from the first data structure mode to the second data structure mode to obtain second service data information (where the second service data information may be transaction record information corresponding to the second data structure mode).

Further, the first node may perform a hash operation on the first service data information according to a hash algorithm to obtain a first hash value (for example, hash value a, hash value b, . . . , hash value n) corresponding to the first service data information. In this case, the first node may perform a hash operation on the second service data information according to the hash algorithm to obtain a second hash value (e.g., hash value A, hash value B, . . . , hash value N) corresponding to the second service data information (for example, service data information A, service data information B, . . . , service data information N). Further, the first node may establish a hash mapping relationship between the first service data information and the second service data information. The hash value a corresponding to the service data information a and the hash value A corresponding to the service data information A have a hash mapping relationship; the hash value b corresponding to the service data information b and the hash value B corresponding to the service data information B have a hash mapping relationship; . . . ; the hash value n corresponding to the service data information n and the hash value N corresponding to the service data information N have a hash mapping relationship. In this case, the first node may migrate the second service data information to the second node, and the second node may pack the second service data information into a block 20C (i.e., a to-be-verified block), perform a consensus check on the block 20C (i.e., the to-be-verified block) based on consensus nodes in the second blockchain network, and when the consensus check is passed, obtain the block 20C (i.e., the target block), and write the block 20C (i.e., the target block) into the blockchain 2. It is to be understood that the block 20C may include second service data information (for example, service data information A, service data information B), and the hash mapping relationship between the first service data information and the second service data information.

In an embodiment, the first node may further obtain key service data information from the blockchain 1 (for example, may obtain transaction record information associated with certain users), where the obtained key service data information may be collectively referred to as first service data information. It can be understood that the key service data information may be the above-mentioned service data information a, service data information b, . . . , and service data information n, or may be part of the above-mentioned service data information a, service data information b, . . . , and service data information n, and the details will not be repeated here. In this case, for the migration process of the first service data information, reference may be made to the above description of the migration process of the service data information in the block 10d, and the details will not be repeated here.

The first node needs to migrate the service data information (that is, the ledger data, for example, the service data information in block 10a, . . . , block 10d) in the blockchain 1 (i.e., the first blockchain) to the blockchain 2 (i.e., the second blockchain). It can be understood that for the migration process of the service data information in any block on the blockchain 1, reference may be made to the above description of the migration process of the service data information in the block 10d, and the details will not be repeated here.

It is to be understood that the first node may obtain a public key of the second node in the second blockchain network. Further, the first node may encrypt the second service data information based on the public key of the second node to obtain encrypted data information. In this case, the first node may migrate the encrypted data information to a second node in the second blockchain network based on the hash mapping relationship. The second node is configured to decrypt the encrypted data information based on a private key associated with the public key to obtain the second service data information. It is to be understood that the private key of the second node may be used for decrypting the second service data information encrypted by the public key of the second node.

Figure 5:
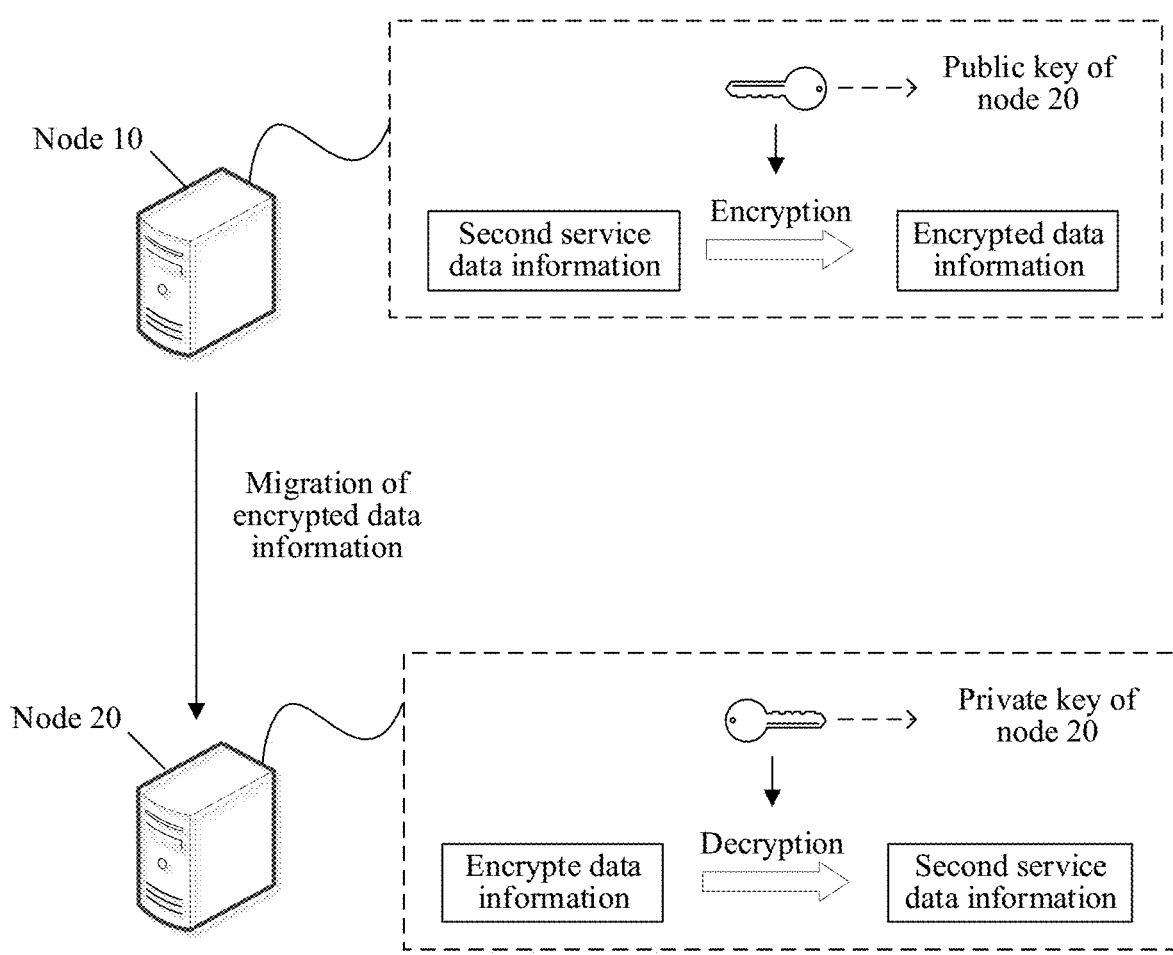
FIG. 5 is a schematic diagram showing migration of service data information according to an embodiment of this disclosure.

For ease of understanding, FIG. 5 is a schematic diagram showing migration of service data information according to an embodiment of this disclosure. As shown in FIG. 5, a node 10 may be a first node (e.g., node 100a) in a first blockchain network (e.g., the first blockchain network shown in FIG. 1), and a node 20 may be a second node (e.g., node 200A) in a second blockchain network (e.g., the second blockchain network shown in FIG. 1). It is to be understood that the node 10 may encrypt second service data information based on a public key of the node 20 to obtain encrypted data information corresponding to the second service data information. In this case, the node 10 may migrate the encrypted data information to the node 20 in the second blockchain network based on a hash mapping relationship between first service data information and the second service data information. In this case, the node 20 may receive the encrypted data information migrated by the node 10, and decrypt the encrypted data information based on a private key of the node 20 to obtain the second service data information. The private key of the node 20 is used for decrypting the encrypted data information corresponding to the second service data information.

Further, after migrating the second service data information to the second node in the second blockchain network, the first node may disable the first blockchain corresponding to the first blockchain network, and instruct the first node to enable the second blockchain corresponding to the second blockchain network. The hash mapping relationship between the first service data information and the second service data information exists in the second blockchain. In other words, after migrating all the service data information (i.e., ledger data) in the first blockchain to the second blockchain, the first node may query (i.e., look for) service data information in the second blockchain according to the hash mapping relationship if a target user needs to query (i.e., find) the service data information (for example, the first service data information).

It can be understood that the first service data information may include target service data information. The target service data information may include an account address of a target user corresponding to a user terminal. It is to be understood that when needing to query (i.e., find) target service data information, the target user may send an initial data query request to the first node by using the user terminal. The user terminal may include a mobile phone, a tablet computer, a notebook computer, a palmtop computer, a mobile Internet device (MID), and a wearable device (such as a smartwatch, a smart band, etc.).

In this case, the first node may obtain an initial data query request sent by the user terminal for the target service data information, the initial data query request being used for instructing the first node to query (i.e., find) the target service data information in the first blockchain based on the account address. It is to be understood that the account address may be determined according to a public key of the target user. Further, in a case that the target service data information is not found in the first blockchain, the first node obtains a hash mapping relationship associated with a hash value of the target service data information. It can be understood that the first node disables the first blockchain after migrating the second service data to the second node, and the user terminal cannot query (i.e., find) target service data information in the first blockchain. In this case, the first node may forward a target data query request to the second node. In other words, the first node may forward a target data query request associated with the account address to the second node based on the hash mapping relationship, the target data query request being used for instructing the second node to query (i.e., find) the target service data information that satisfies the hash mapping relationship in the second blockchain based on the account address.

In the embodiments of this disclosure, a first node in a first blockchain network may convert first service data information corresponding to a first data structure mode into second service data information corresponding to a second data structure mode and establish a hash mapping relationship between the first service data information and the second service data information, so that the second service data information can be quickly found. In addition, the first node may further migrate the second service data information to a second node based on the hash mapping relationship. Whereby, the data migration efficiency can be improved and the security of migrated data can be increased.

Figure 6:
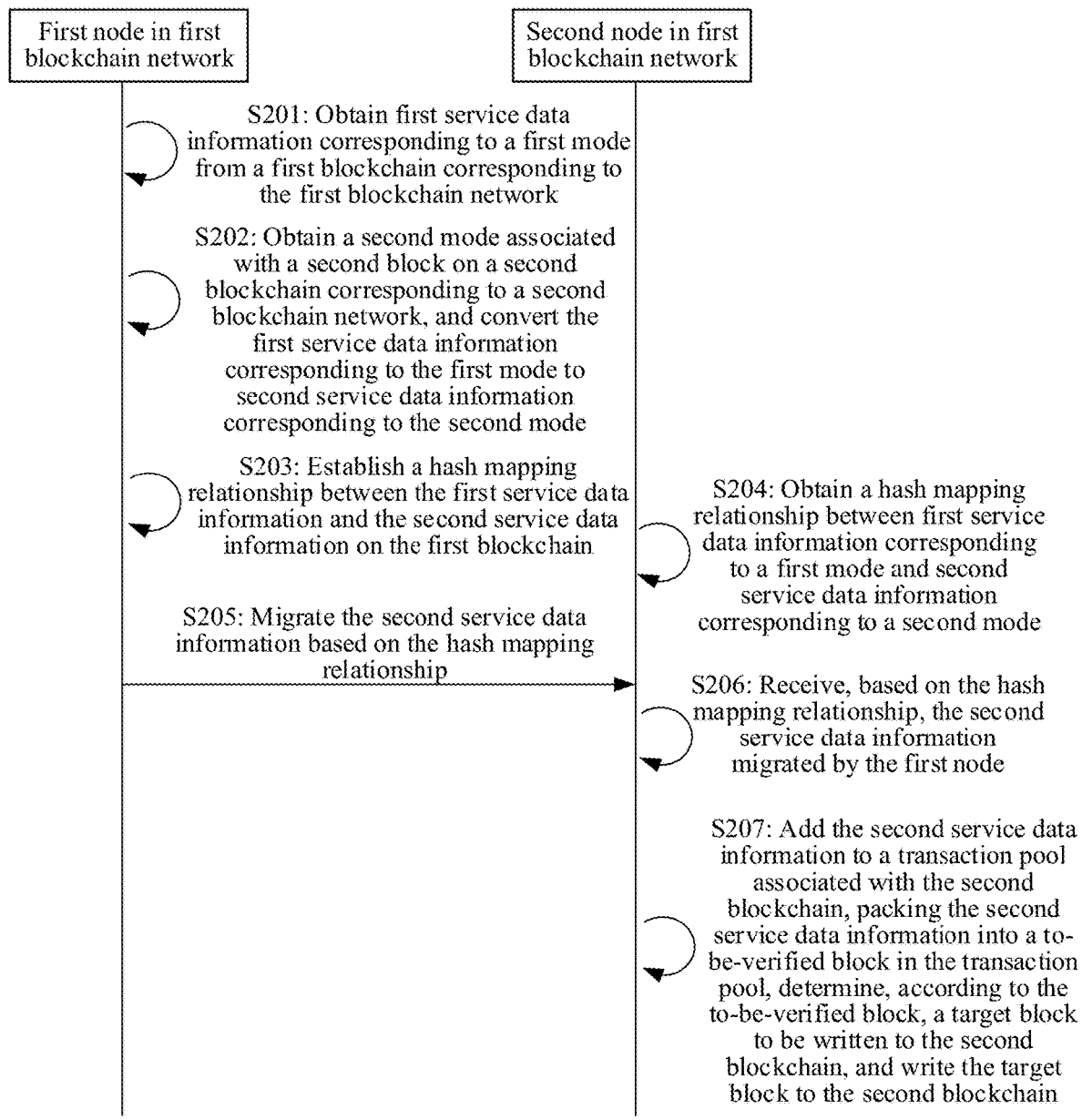
FIG. 6 is a schematic flowchart of a cross-blockchain data migration method according to an embodiment of this disclosure.

Further, FIG. 6 is a schematic flowchart of a cross-blockchain data migration method according to an embodiment of this disclosure. This method is performed by interaction between a first node in a first blockchain network and a second node in a second blockchain network. The first node may be the node A shown in FIG. 2, and the second node may be the node B shown in FIG. 2. As shown in FIG. 6, the method may include the following steps:

In step S201, first service data information corresponding to a first mode (e.g., a first data structure mode) is obtained from a first blockchain corresponding to the first blockchain network.

Specifically, the first node in the first blockchain obtains the first service data information corresponding to the first mode from the first blockchain corresponding to the first blockchain network, the first mode being determined by a data structure mode of the first service data information stored in a first block in the first blockchain.

In step S202, a second mode (e.g., a second data structure mode) associated with a second block on a second blockchain corresponding to a second blockchain network is obtained, and the first service data information corresponding to the first mode is converted to second service data information corresponding to the second mode.

Specifically, the first node in the first blockchain network may obtain a second mode associated with a second block on a second blockchain corresponding to a second blockchain network, and converting the first service data information corresponding to the first mode to second service data information corresponding to the second mode.

In step S203, a hash mapping relationship is established between the first service data information and the second service data information in the first blockchain.

Specifically, the first node in the first blockchain network may establish a hash mapping relationship between the first service data information and the second service data information in the first blockchain.

For specific implementations of step S201 to step S203, reference may be made to the description of step S101 to step S103 in the embodiment corresponding to FIG. 3, which will not be repeated here.

In step S204, a hash mapping relationship is obtained between first service data information corresponding to a first mode and second service data information corresponding to a second mode.

Specifically, the second node in the second blockchain network may obtain the hash mapping relationship between the first service data information corresponding to the first mode and the second service data information corresponding to the second mode. For example, the hash mapping relationship between the first service data information and the second service data information may be as shown in Table 2 above. The hash mapping relationship is established by a first node in a first blockchain network on a first blockchain corresponding to the first blockchain network. The first service data information is obtained by the first node from the first blockchain. the first mode being determined by a data structure mode of the first service data information stored in a first block in the first blockchain. The second service data information is determined by the first node by obtaining the second mode associated with a second block on a second blockchain corresponding to the second blockchain network and converting the first service data information corresponding to the first mode to the second mode.

In step S205, the second service data information is migrated based on the hash mapping relationship.

Specifically, the first node in the first blockchain network may migrate the second service data information to the second node in the second blockchain network based on the hash mapping relationship. The second node is configured to write a target block including the second service data information into the second blockchain after adding the second service data information to a transaction pool associated with the second blockchain.

For a specific implementation of step S205, reference may be made to the description of step S104 in the embodiment corresponding to FIG. 3, which will not be repeated here.

In step S206 the second service data information migrated by the first node is received based on the hash mapping relationship.

Specifically, the second node in the second blockchain network may receive, based on the hash mapping relationship, the second service data information migrated by the first node. The hash mapping relationship may include a first hash value corresponding to the first service data information and a second hash value corresponding to the second service data information. It can be understood that, after the first node migrates the second service data information to the second node in the second blockchain network based on the hash mapping relationship, the second node may receive, based on the second hash value corresponding to the second service data information in the hash mapping relationship, the second service data migrated by the first node. It is to be understood that the hash mapping relationship between the first service data information and the second service data information is mainly used for providing the following function: when a target user queries a service corresponding to the first service data information by using the first hash value, the second hash value in the hash mapping relationship may indicate a location that is associated with the second hash value in the second blockchain and to which the service corresponding to the first service data information is migrated.

It can be understood that the second node may receive, based on the hash mapping relationship, encrypted data information migrated by the first node. It is to be understood that the encrypted data information is obtained by the first node by encrypting the second service data information according to a public key of the second node. Further, the second node may decrypt the encrypted data information based on a private key associated with the public key to obtain the second service data information. For example, the process for the second node to receive the encrypted data information may be as shown in FIG. 5. The node 20 may decrypt the encrypted data information based on a private key associated with the public key (i.e., the private key of the second node) to obtain the second service data information. In this case, after receiving the second service data information, the second node may write the second service data information into the second blockchain.

In step S207, the second service data information is added to a transaction pool associated with the second blockchain, the second service data information is packed into a to-be-verified block in the transaction pool, a target block to be written to the second blockchain is determined according to the to-be-verified block, and the target block is written to the second blockchain.

Specifically, the second node in the second blockchain network may add the second service data information to a transaction pool associated with the second blockchain, and write a target block including the second service data information into the second blockchain. In other words, the second node may add the second service data information to the transaction pool associated with the second blockchain, and pack the second service data information into the to-be-verified block in the transaction pool. The transaction pool associated with the second blockchain may receive the second service data information, and perform a parameter and service validity check on the second service data information before the second service data information is packed into a to-be-verified block. The to-be-verified block may be a block that has not been subjected to a consensus check performed by consensus nodes in the second blockchain network. In this case, the second node may transmit the to-be-verified block to consensus nodes in the second blockchain network for consensus verification.

Further, the second node may obtain consensus confirmation information returned by the consensus nodes in the second blockchain network. It is to be understood that after the second node transmits the to-be-verified block to the consensus nodes in the second blockchain network for consensus verification, if the to-be-verified block does not pass the consensus verification performed by a consensus node, the consensus node does not return consensus confirmation information to the second node, that is, the consensus verification on the to-be-verified block fails; if the to-be-verified block pass the consensus verification performed by a consensus node, the consensus node may return consensus confirmation information to the second node. In this case, the server node may obtain the consensus confirmation information returned by the consensus node in the blockchain network. One consensus node may correspond to one piece of consensus confirmation information.

Further, in case that a total number of pieces of the consensus confirmation information is greater than a consensus threshold of the consensus node, it is determined that the consensus verification is successful, the to-be-verified block that has passed the consensus verification is determined as the target block, and the target block is added to the second blockchain. For example, it is assumed that the number of consensus nodes in the second blockchain network is A, the total number of pieces of consensus confirmation information counted by the second node is B, and the consensus threshold corresponding to the consensus nodes in the second blockchain network is 0.8 A. In this case, if the total number B of pieces of consensus confirmation information is less than 0.8 A, it is determined that the consensus verification on the to-be-verified block fails; if the total number B of pieces of consensus confirmation information is greater than or equal to 0.8 A, it is determined that the consensus verification on the to-be-verified block is successful.

Figure 7:
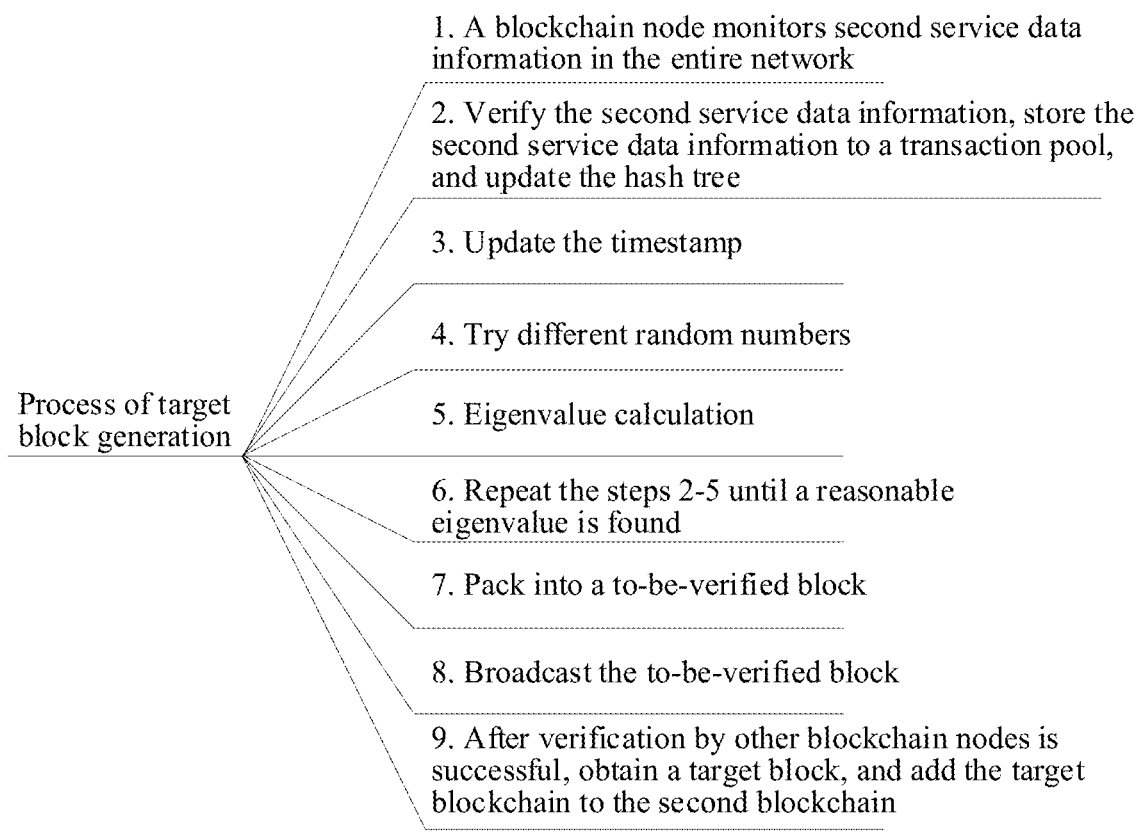
FIG. 7 is a schematic diagram showing generation of a target block according to an embodiment of this disclosure.

For ease of understanding, FIG. 7 is a schematic diagram showing generation of a target block according to an embodiment of this disclosure. As shown in FIG. 7, in the process of generating a target block in the second blockchain, the blockchain node in the second blockchain may verify second service data information when receiving the second service data information, and after the verification is completed, store the second service data information in a transaction pool, and updates a hash tree configured for recording the second service data information. Next, the timestamp is updated to the time at which the second service data information is received, different random numbers are tried, and eigenvalue calculation is performed for multiple times, so that the calculated eigenvalue satisfies the following formula (1):

$$SHA256(SHA256(version+prev\_hash+merkle\_root+ntime+nbits+x))<TARGET \quad (1)$$

where SHA256 is an eigenvalue algorithm used to calculate the eigenvalue; version is the version information of the relevant block protocol in the second blockchain; prev_hash is the block header eigenvalue of the parent block of the current block; merkle_root is the eigenvalue of the second service data information; ntime is the update time of the updated timestamp; nbits is the current difficulty, which is a fixed value in a period of time and is determined again after the period of time; x is a random number; and TARGET is an eigenvalue threshold, which may be determined according to nbits.

It can be understood that when a random number satisfying the above formula is obtained by calculation, that is, when the obtained random number x can make the eigenvalue calculated by the SHA256 eigenvalue algorithm smaller than the eigenvalue threshold, the second service data information may be stored correspondingly, and a block header and a block body may be generated to obtain a to-be-verified block. Subsequently, the second node transmits the to-be-verified block to other blockchain nodes in the second blockchain network (for example, consensus nodes) according to node identifiers of the other blockchain nodes in the second blockchain network); the other blockchain nodes verify the to-be-verified block (for example, the consensus nodes in the second blockchain network performs consensus verification on the to-be-verified block); after the verification is completed, a target block is obtained, and the target block is added to the second blockchain (for example, the blockchain 2 in the embodiment corresponding to FIG. 2 above).

For example, as shown in FIG. 2, the node B (i.e., the second node) may write the second service data information into the blockchain 2 (i.e., the second blockchain).

It can be understood that the blockchain 2 shown in FIG. 2 may be the blockchain corresponding to the second blockchain network in FIG. 1, the blockchain 2 may be the same blockchain shared by each node in the second blockchain network corresponding to the node B (i.e., the second node), and in the blockchain 2, each node may obtain information stored in the blockchain 2. The blockchain 2 may include a block 20A, a block 20B, . . . , a block 20N, and a to-be-verified block. The block 20A may be referred to as a genesis block of the blockchain 2. The to-be-verified block in the blockchain 2 may include second service data information. In addition, the node B performs consensus verification on the to-be-verified block based on the consensus nodes in the second blockchain network, and when the consensus verification is passed, adds the to-be-verified block as a target block in the blockchain 2. The target block may be a block with a largest timestamp on the blockchain 2.

It can be understood that the node B (i.e., the second node) may add the second service data information to the transaction pool associated with the blockchain 2, and pack the second service data information into the to-be-verified block in the transaction pool. In this case, the node B (i.e., the second node) broadcasts the to-be-verified block including the second service data information to all blockchain nodes in the second blockchain network (e.g., consensus nodes for consensus processing), and when it is determined that all the blockchain nodes reach a consensus, generates the target block including the second service data information. In this case, the node B (i.e., the second node) may add the target block to the above-mentioned blockchain 2, that is, use the target block as a block next to the block 20N. In the embodiments of this disclosure, by writing the second service data information into the blockchain 2 (i.e., the second blockchain), the authenticity of the second service data information can be ensured, to prevent malicious tampering by others.

Figure 8:
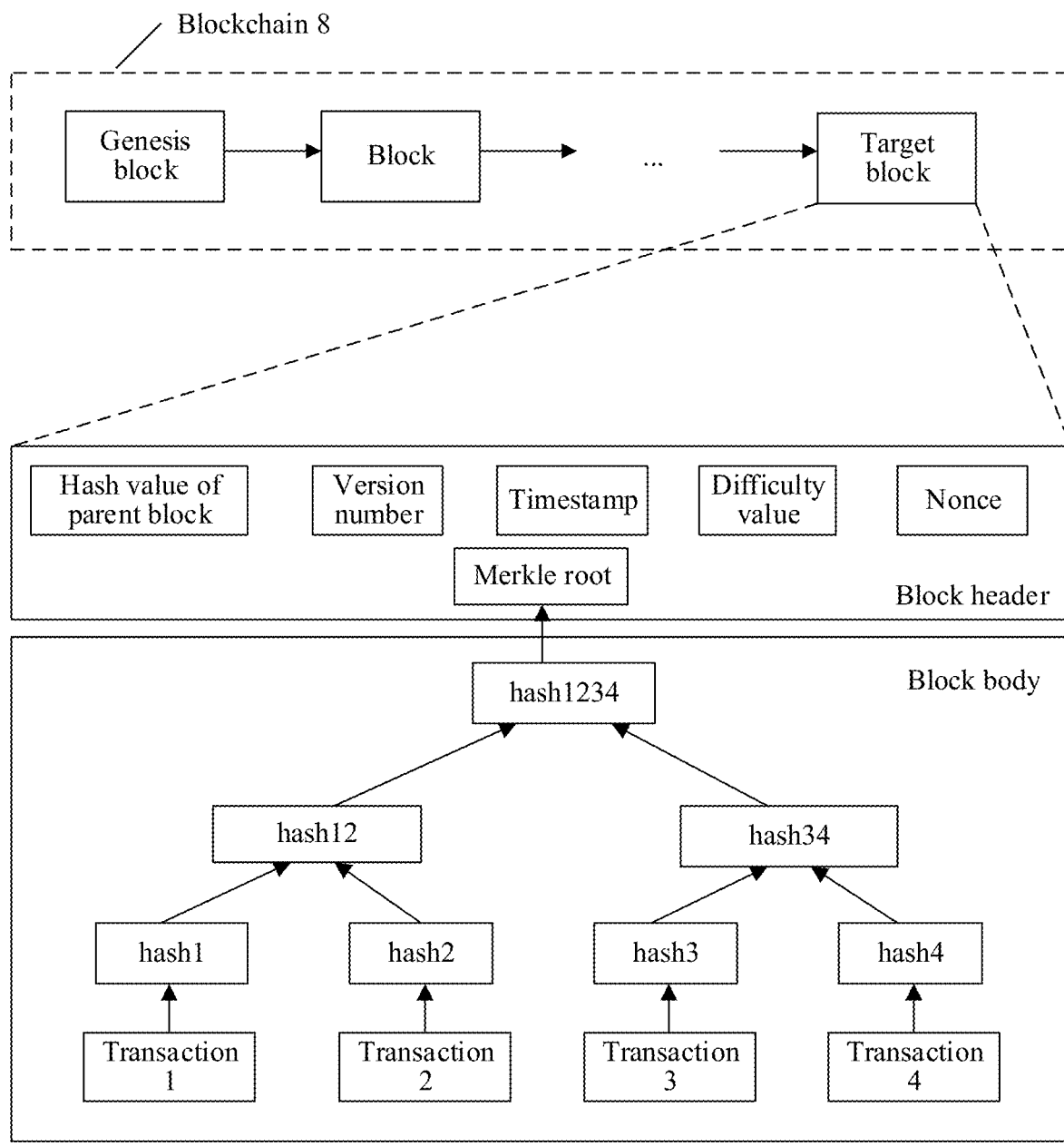
FIG. 8 is a schematic structural diagram of a target block according to an embodiment of this disclosure.

For ease of understanding, FIG. 8 is a schematic structural diagram of a target block according to an embodiment of this disclosure. As shown in FIG. 8, the target block may be a block with a largest timestamp in a blockchain 8. The blockchain 8 may be the second blockchain corresponding to the second blockchain network. For example, the blockchain 8 may be as shown in the above-mentioned blockchain 2 in FIG. 2. A genesis block in the blockchain 8 may be the block 20A in the blockchain 2. The genesis block in the blockchain 8 may also be referred to as a parent block. It is to be understood that the target block in the blockchain 8 may be obtained according to the target block generation process shown in FIG. 7. The target block may include a block header. The block header may include a hash value of the parent block, a version number, a timestamp, a difficulty value, a random number, and a Merkle root. It is to be understood that the Merkle root (i.e., hash1234, also known as the root hash value) may be obtained by combining hash12 and hash34 into a character string and performing a hash operation on the character string. It can be understood that hash12 may be obtained by combining hash1 and hash2 into a character string and performing a hash operation on the character string. hash1 may be a hash value corresponding to transaction 1, and hash2 may be a hash value corresponding to transaction 2. It can be understood that hash34 can be obtained by combining hash3 and hash4 into a character string and performing a hash operation on the character string. hash3 may be a hash value corresponding to transaction 3, and hash4 may be a hash value corresponding to transaction 4. It is to be understood that the target block may include 4 transactions (for example, transaction 1, transaction 2, transaction 3 and transaction 4), and hash1, hash2, hash3, and hash4 may all be hash values corresponding to service data information (for example, the second service data information). The second hash value corresponding to the second service data information in the embodiments of this disclosure may be any one of hash1, hash2, hash3, or hash4, that is, the second service data information may be any one of transaction 1, transaction 2, transaction 3, or transaction 4.

It can be understood that the first service data information includes target service data information. The target service data information includes an account address of a target user corresponding to a user terminal. In this case, if the first node does not find the second service data information in the first blockchain based on the initial data query request, the first node may forward the target data query request to the second node.

Further, the second node may obtain a target data query request associated with the account address and forwarded by the first node. The target data query request is transmitted by the user terminal for the target service data information. It is to be understood that the target data query request is used for instructing the second node to query (i.e., find) the target service data information that satisfies the hash mapping relationship in the second blockchain based on the account address.

Further, the second node may use a hash value of the target service data information carried in the target data query request as an initial hash value, and determine a target hash value associated with the initial hash value from the hash mapping relationship. Further, the second node may search for a target block associated with the target hash value from the second blockchain according to the target hash value. In this case, the second node may obtain the target service data information from the target block based on the account address.

Specifically, the second node may search for a target block associated with the target hash value from the second blockchain according to the target hash value. In this case, the second node may obtain a first root hash value under an authentication path to which the target hash value belongs. It is to be understood that each block (e.g., the target block) in the second blockchain has a uniquely determined root hash value, so the second node may determine the target block according to the first root hash value.

For example, as shown in FIG. 8 above, any one of hash1, hash2, hash3, or hash4 has a unique authentication path. For example, if the target hash value corresponding to the initial hash value of the target service data information is hash3 corresponding to transaction 3 in FIG. 8, the authentication path of hash3 (i.e., the target hash value) belongs may be hash3-hash34-hash1234, so that it may be determined that hash1234 (that is, the root hash value) is the first root hash value.

Further, the second node may obtain root hash value information corresponding to each block in the second blockchain. In this case, the second node may search for the root hash value information that matches the first root hash value among the root hash value information of the blocks. Further, the second node may use the found root hash value information that matches the first root hash value as a second root hash value, and use the block corresponding to the second root hash value as the target block.

Figure 9:
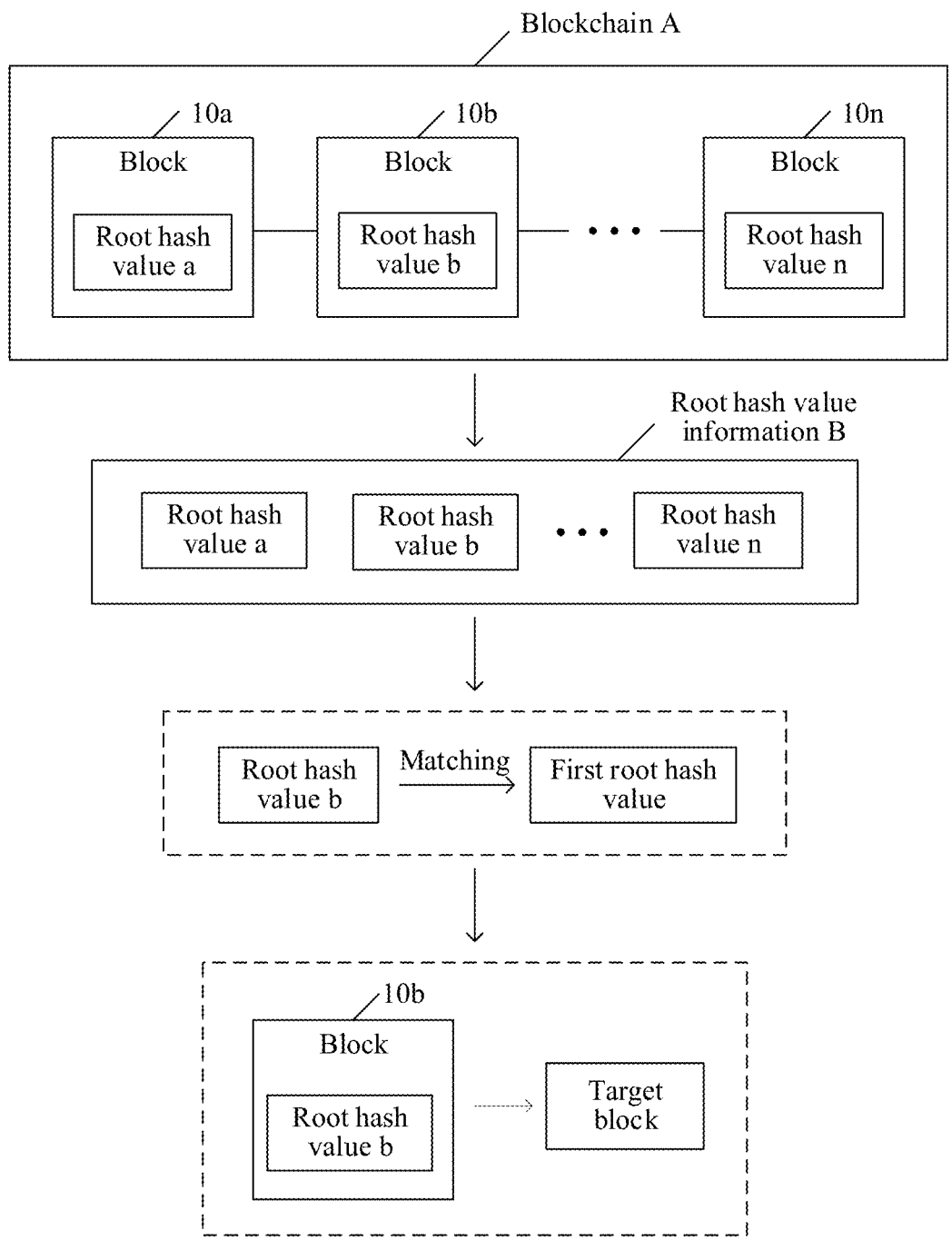
FIG. 9 is a schematic diagram showing determining of a target block according to an embodiment of this disclosure.

For ease of understanding, FIG. 9 is a schematic diagram showing determining of a target block according to an embodiment of this disclosure. As shown in FIG. 9, the blockchain A may be the second blockchain, and the blockchain A may include block 10a, block 10b, . . . , block 10n. Root hash value information included in the block 10a is root hash value a, root hash value information included in the block 10b is root hash value b, . . . , and root hash value information included in the block 10n is root hash value n. It is to be understood that the root hash value information B may include the root hash value information included in each block in the blockchain A (for example, root hash value a, root hash value b, . . . , root hash value n). It can be understood that the second node may traverse all the root hash value information in the root hash value information B, search for the root hash value information that matches the first root hash value, and then determine that the root hash value b matches the first root hash value. In this case, the second node may use the root hash value b as the second root hash value. It is to be understood that the second node may use the block 10b to which the root hash value b (i.e., the second root hash value) belongs as the target block associated with the second service data information. In this case, the second node may obtain the target service data information from the target block based on the account address.

In the embodiments of this disclosure, a first node in a first blockchain network may convert first service data information corresponding to a first mode into second service data information corresponding to a second mode, and establish a hash mapping relationship between the first service data information and the second service data information, so that the second service data information can be quickly found. In addition, the first node may further migrate the second service data information to a second node based on the hash mapping relationship. Whereby, the data migration efficiency can be improved and the security of migrated data can be increased.

Figure 10:
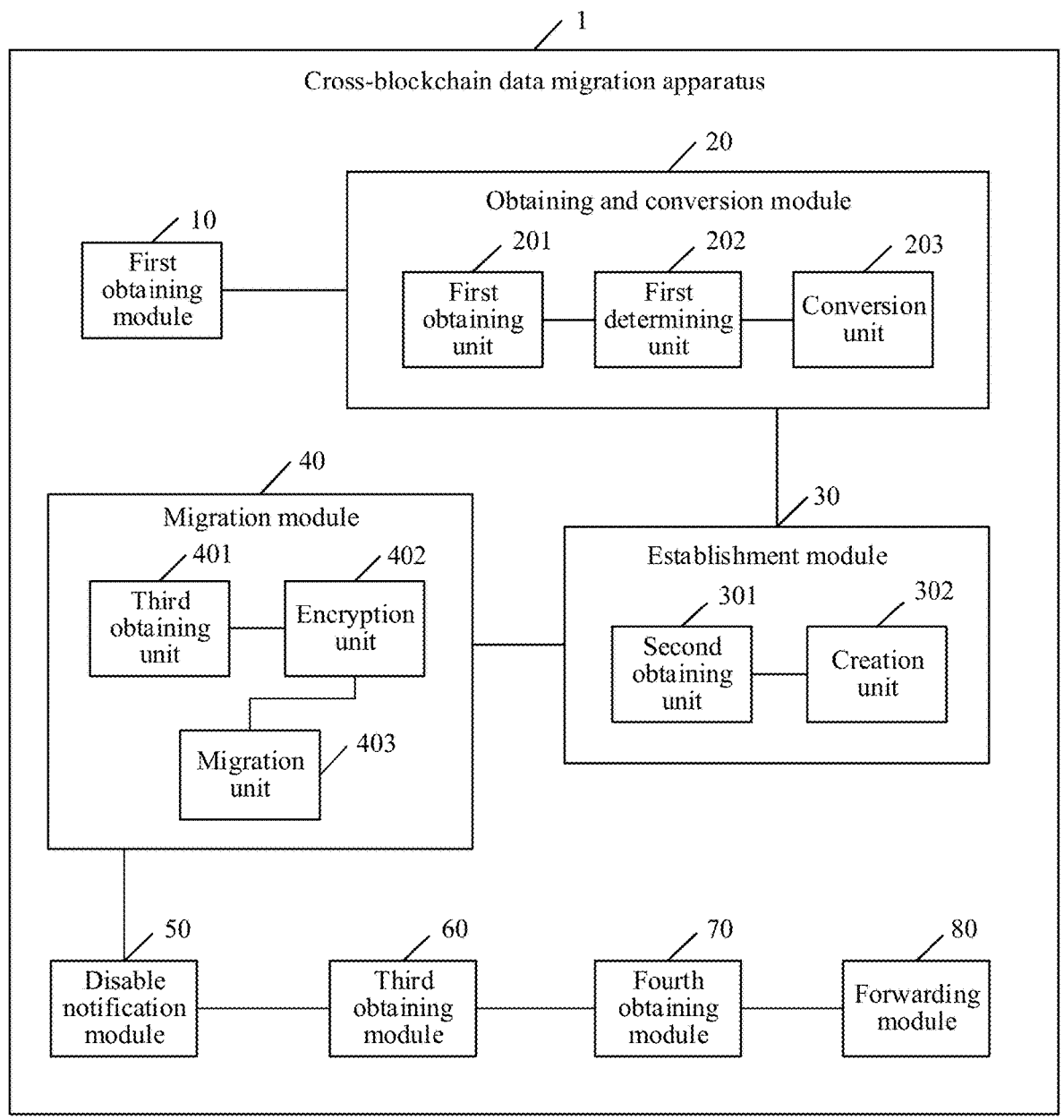
FIG. 10 is a schematic structural diagram of a cross-blockchain data migration apparatus according to an embodiment of this disclosure.

Further, FIG. 10 is a schematic structural diagram of a cross-blockchain data migration apparatus according to an embodiment of this disclosure. The cross-blockchain data migration apparatus may be a computer program (including program code) running in a node device. For example, the cross-blockchain data migration apparatus may be an application software. The cross-blockchain data migration apparatus may be configured to execute the corresponding steps in the method provided in the embodiments of this disclosure. As shown in FIG. 10, the cross-blockchain data migration apparatus 1 may run on a first node in a first blockchain network, and the first node may be the node A in the embodiment corresponding to FIG. 2 above. The cross-blockchain data migration apparatus 1 may include: a first obtaining module 10, an obtaining and conversion module 20, an establishment module 30, a migration module 40, a disable notification module 50, a third obtaining module 60, a fourth obtaining module 70, and a forwarding module 80. One or more modules and units of the apparatus can be implemented by processing circuitry, software, or a combination thereof, for example.

The first obtaining module 10 is configured to obtain first service data information corresponding to a first mode from a first blockchain corresponding to the first blockchain network, the first mode being determined by a data structure mode of the first service data information stored in a first block in the first blockchain. For a specific implementation of the first obtaining module 10, reference may be made to the description of step S101 in the embodiment corresponding to FIG. 3 and the description of step S201 in the embodiment corresponding to FIG. 6.

The obtaining and conversion module 20 is configured to obtain a second mode associated with a second block on a second blockchain corresponding to a second blockchain network, and convert the first service data information corresponding to the first mode to second service data information corresponding to the second mode.

The obtaining and conversion module 20 includes: a first obtaining unit 201, a first determining unit 202, and a conversion unit 203.

The first obtaining unit 201 is configured to obtain a data structure mode of service data information in the second block according to the second node having a network connection relationship with the first node, the second block being a block in the second blockchain corresponding to the second blockchain network to which the second node belongs.

The first determining unit 202 is configured to use the data structure mode of the service data information in the second block as a second mode.

The conversion unit 203 is configured to convert the data structure mode of the first service data information from the first mode to the second mode, and use the first service data information in the second mode as the second service data information.

For specific implementations of the first obtaining unit 201, the first determining unit 202, and the conversion unit 203, reference may be made to the description of step S102 in the embodiment corresponding to FIG. 3 and the description of step S202 in the embodiment corresponding to FIG. 6, and the details will not be repeated here.

The establishment module 30 is configured to establish a hash mapping relationship between the first service data information and the second service data information in the first blockchain.

The establishment module 30 includes: a second obtaining unit 301 and a creation unit 302.

The second obtaining unit 301 is configured to obtain a first hash value corresponding to the first service data information and a second hash value corresponding to the second service data information.

The creation unit 302 is configured to create an initial mapping relationship between the first hash value and the second hash value in the first blockchain and use the initial mapping relationship as the hash mapping relationship between the first service data information and the second service data information.

For specific implementations of the second obtaining unit 301 and the creation unit 302, reference may be made to the description of step S103 in the embodiment corresponding to FIG. 3 and the description of step S203 in the embodiment corresponding to FIG. 6, and the details will not be repeated here.

The migration module 40 is configured to migrate the second service data information to a second node in the second blockchain network based on the hash mapping relationship, the second node being configured to write a target block including the second service data information into the second blockchain after adding the second service data information to a transaction pool associated with the second blockchain.

The migration module 40 includes: a third obtaining unit 401, an encryption unit 402, and a migration unit 403.

The third obtaining unit 401 is configured to obtain a public key of the second node in the second blockchain network.

The encryption unit 402 is configured to encrypt the second service data information based on the public key to obtain encrypted data information.

The migration unit 403 is configured to migrate the encrypted data information to a second node in the second blockchain network based on the hash mapping relationship, the second node being configured to decrypt the encrypted data information based on a private key associated with the public key to obtain the second service data information.

For specific implementations of the third obtaining unit 401, the encryption unit 402, and the migration unit 403, reference may be made to the description of step S104 in the embodiment corresponding to FIG. 3 and the description of step S205 in the embodiment corresponding to FIG. 6, and the details will not be repeated here.

The cross-blockchain data migration apparatus 1 further includes: a disable notification module 50, configured to disable the first blockchain corresponding to the first blockchain network, and instruct the first node to enable the second blockchain corresponding to the second blockchain network, the hash mapping relationship between the first service data information and the second service data information exists in the second blockchain.

The first service data information includes target service data information; the target service data information includes an account address of a target user corresponding to a user terminal; and the cross-blockchain data migration apparatus 1 further includes: a third obtaining module 60, configured to obtain an initial data query request sent by the user terminal for the target service data information, the initial data query request being used for instructing the first node to query (i.e., find) the target service data information in the first blockchain based on the account address; a fourth obtaining module 70, configured to, in a case that the target service data information is not found in the first blockchain, obtain a hash mapping relationship associated with a hash value of the target service data information; and a forwarding module 80, configured to forward a target data query request associated with the account address to the second node based on the hash mapping relationship, the target data query request being used for instructing the second node to query (i.e., find) the target service data information that satisfies the hash mapping relationship in the second blockchain based on the account address.

For specific implementations of the first obtaining module 10, the obtaining and conversion module 20, the establishment module 30, the migration module 40, the disable notification module 50, the third obtaining module 60, the fourth obtaining module 70, and the forwarding module 80, reference may be made to the description of step S101 to step S104 in the embodiment corresponding to FIG. 3 and the description of steps S201-S203 and step S205 in the embodiment corresponding to FIG. 6, and the details will not be repeated here. In addition, the description of beneficial effects of the same method are not described herein again.

Figure 11:
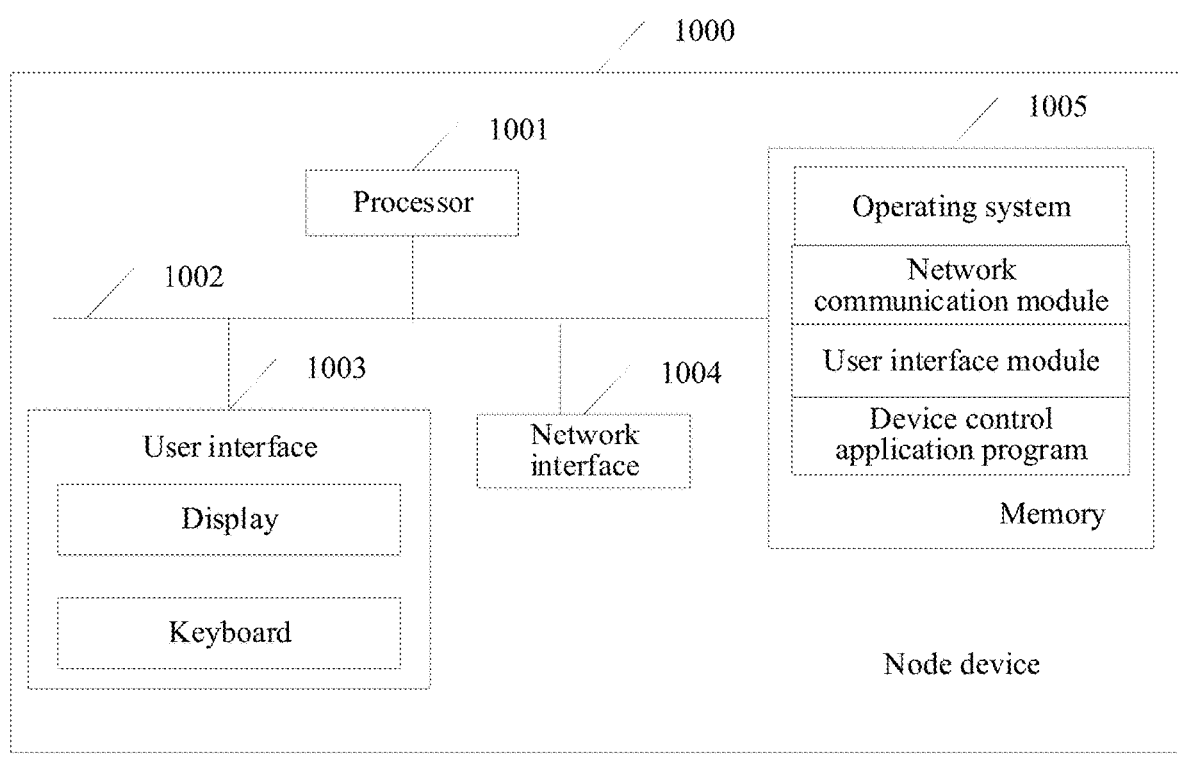
FIG. 11 is a schematic diagram of a node device according to an embodiment of this disclosure.

Further, FIG. 11 is a schematic diagram of a node device according to an embodiment of this disclosure. As shown in FIG. 11, the node device 1000 may include: processing circuitry (for example, at least one processor 1001, e.g., a central processing unit (CPU)), at least one network interface 1004, user interface 1003, memory 1005 (i.e., a non-transitory computer-readable storage medium), and at least one communication bus 1002. The communication bus 1002 is configured to implement connection and communication between these components. The user interface 1003 may include a display and a keyboard. In an embodiment, the network interface 1004 may include a standard wired interface and a standard wireless interface (for example, a Wi-Fi interface). The memory 1005 may be a high-speed random access memory (RAM), or may be a non-volatile memory, for example, at least one magnetic disk memory. In an embodiment, the memory 1005 may alternatively be at least one storage apparatus located remotely from the processor 1001. As shown in FIG. 11, the memory 1005 used as a computer storage medium may include an operating system, a network communication module, a user interface module, and a device control application program.

In the node device 1000 shown in FIG. 11, the network interface 1004 is mainly configured for communication with a second node via a network; the user interface 1003 is mainly configured to provide an input interface for a user, and the processor 1001 may be configured to invoke the device control application program stored in the memory 1005, to implement: obtaining first service data information corresponding to a first mode from a first blockchain corresponding to the first blockchain network, the first mode being determined by a data structure mode of the first service data information stored in a first block in the first blockchain; obtaining a second mode associated with a second block on a second blockchain corresponding to a second blockchain network, and converting the first service data information corresponding to the first mode to second service data information corresponding to the second mode; establishing a hash mapping relationship between the first service data information and the second service data information in the first blockchain; and migrating the second service data information to a second node in the second blockchain network based on the hash mapping relationship, the second node being configured to write a target block including the second service data information into the second blockchain after adding the second service data information to a transaction pool associated with the second blockchain.

It is to be understood that the node device 1000 described in the embodiments of this disclosure may implement the descriptions of the cross-blockchain data migration methods in the foregoing embodiments corresponding to FIG. 3 and FIG. 6 and may also implement the descriptions of the cross-blockchain data migration apparatus 1 in the foregoing embodiment corresponding to FIG. 10, and the details will not be repeated here. In addition, the description of beneficial effects of the same method are not described herein again.

In addition, it is to be noted that: an embodiment of this disclosure further provides a computer-readable storage medium. The computer-readable storage medium stores a computer program executed by the cross-blockchain data migration apparatus 1 mentioned above, and the computer program includes program instructions. When executing the program instructions, the processor can implement the descriptions of the cross-blockchain data migration method in the foregoing embodiment corresponding to FIG. 3 or FIG. 6. Therefore, the details will not be repeated here. In addition, the description of beneficial effects of the same method are not described herein again. For technical details that are not disclosed in the embodiment of the computer-readable storage medium of this disclosure, reference may be made to the descriptions of the method embodiments of this disclosure. By way of example, the program instructions may be deployed to be executed by one computing device, or by a plurality of computing devices located at a same location, or by a plurality of computing devices distributed at a plurality of locations and interconnected via a communication network. The plurality of computing devices distributed at the plurality of locations and interconnected via the communication network can form a blockchain system.

Figure 12:
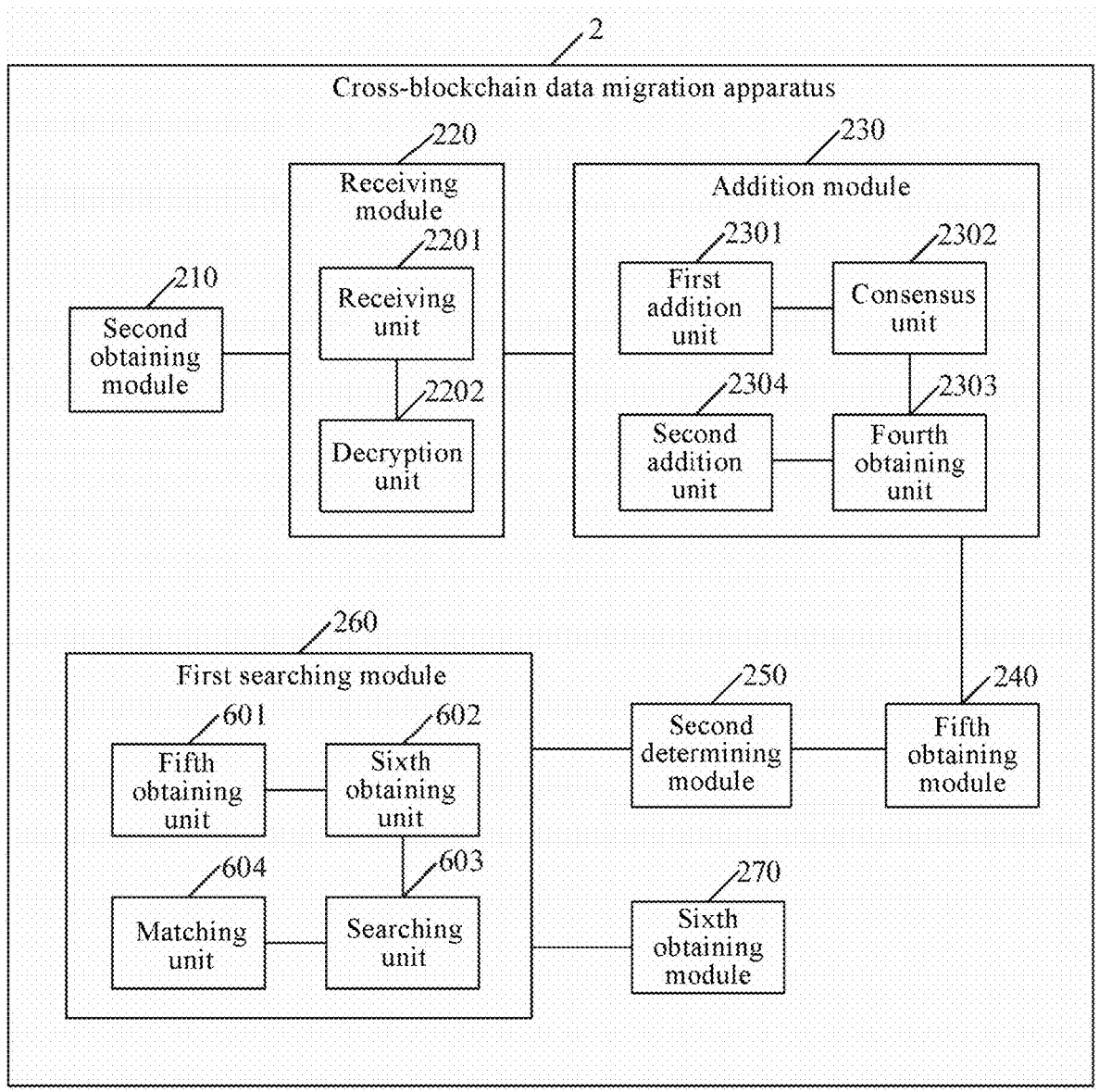
FIG. 12 is a schematic structural diagram of a cross-blockchain data migration apparatus according to an embodiment of this disclosure.

Further, FIG. 12 is a schematic structural diagram of a cross-blockchain data migration apparatus according to an embodiment of this disclosure. The cross-blockchain data migration apparatus may be a computer program (including program code) running in a node device. For example, the cross-blockchain data migration apparatus may be an application software. The cross-blockchain data migration apparatus may be configured to execute the corresponding steps in the method provided in the embodiments of this disclosure. As shown in FIG. 12, the cross-blockchain data migration apparatus 2 may run on a second node in a second blockchain network, and the second node may be the node B in the embodiment corresponding to FIG. 2 above. The cross-blockchain data migration apparatus 2 may include: a second obtaining module 210, a receiving module 220, an addition module 230, a fifth obtaining module 240, a second determining module 250, a first searching module 260, and a sixth obtaining module 270. One or more modules and units of the apparatus can be implemented by processing circuitry, software, or a combination thereof, for example.

The second obtaining module 210 is configured to obtain a hash mapping relationship between first service data information corresponding to a first mode and second service data information corresponding to a second mode, the hash mapping relationship being established by a first node in a first blockchain network on a first blockchain corresponding to the first blockchain network, the first service data information being obtained by the first node from the first blockchain, the first mode being determined by a data structure mode of the first service data information stored in a first block in the first blockchain, and the second service data information being determined by the first node by obtaining the second mode associated with a second block on a second blockchain corresponding to the second blockchain network and converting the first service data information corresponding to the first mode to the second mode.

The receiving module 220 is configured to receive, based on the hash mapping relationship, the second service data information migrated by the first node.

The addition module 230 is configured to add the second service data information to a transaction pool associated with the second blockchain, pack the second service data information into a to-be-verified block in the transaction pool, determine, according to the to-be-verified block, a target block to be written to the second blockchain, and write the target block to the second blockchain.

For a specific implementation of the second obtaining module 210, reference may be made to the description of step S204 in the embodiment corresponding to FIG. 6.

The receiving module 220 includes: a receiving unit 2201 and a decryption unit 2202.

The receiving unit 2201 is configured to receive, based on the hash mapping relationship, encrypted service data information migrated by the first node, the encrypted data information being obtained by the first node by encrypting the second service data information according to a public key of the second node.

The decryption unit 2202 is configured to decrypt the encrypted data information based on a private key associated with the public key to obtain the second service data information.

For specific implementations of the receiving unit 2201 and the decryption unit 2202, reference may be made to the description of step S206 in the embodiment corresponding to FIG. 6, and the details will not be repeated here.

The addition module 230 includes: a first addition unit 2301, a consensus unit 2302, a fourth obtaining unit 2303, and a second addition unit 2304.

The first addition unit 2301 is configured to add the second service data information to the transaction pool associated with the second blockchain, and pack the second service data information into the to-be-verified block in the transaction pool.

The consensus unit 2302 is configured to transmit the to-be-verified block to consensus nodes in the second blockchain network for consensus verification.

The fourth obtaining unit 2303 is configured to obtain consensus confirmation information returned by the consensus nodes in the second blockchain network.

The second addition unit 2304 is configured to, in case that a total number of pieces of the consensus confirmation information is greater than a consensus threshold of the consensus node, determine that the consensus verification is successful, determine the to-be-verified block that has passed the consensus verification as the target block, and add the target block to the second blockchain.

For specific implementations of the first addition unit 2301, the consensus unit 2302, the fourth obtaining unit 2303, and the second addition unit 2304, reference may be made to the description of step S207 in the embodiment corresponding to FIG. 6, and the details will not be repeated here.

The first service data information includes target service data information; the target service data information includes an account address of a target user corresponding to a user terminal; and the cross-blockchain data migration apparatus 2 further includes: a fifth obtaining module 240, configured to obtain a target data query request associated with the account address and forwarded by the first node, the target data query request being transmitted by the user terminal for the target service data information; a second determining module 250, configured to use a hash value of the target service data information carried in the target data query request as an initial hash value, and determine a target hash value associated with the initial hash value from the hash mapping relationship; a first searching module 260, configured to search for a target block associated with the target hash value from the second blockchain according to the target hash value; and a sixth obtaining module 270, configured to obtain the target service data information from the target block based on the account address.

The first searching module 260 includes: a fifth obtaining unit 601, a sixth obtaining unit 602, a searching unit 603, and a matching unit 604.

The fifth obtaining unit 601 is configured to obtain a first root hash value under an authentication path to which the target hash value belongs.

The sixth obtaining unit 602 is configured to obtain root hash value information corresponding to each block in the second blockchain.

The searching unit 603 is configured to search for the root hash value information that matches the first root hash value among the root hash value information of the blocks.

The matching unit 604 is configured to use the found root hash value information that matches the first root hash value as a second root hash value, and use the block corresponding to the second root hash value as the target block.

For specific implementations of the fifth obtaining unit 601, the sixth obtaining unit 602, the searching unit 603, and the matching unit 604, reference may be made to the description of step S207 in the embodiment corresponding to FIG. 6, and the details will not be repeated here.

For specific implementations of the second obtaining module 210, the receiving module 220, the addition module 230, the fifth obtaining module 240, the second determining module 250, the first searching module 260, and the sixth obtaining module 270, reference may be made to the description of step S204 to step S207 in the embodiment corresponding to FIG. 6, which will not be repeated here. In addition, the description of beneficial effects of the same method are not described herein again.

Figure 13:
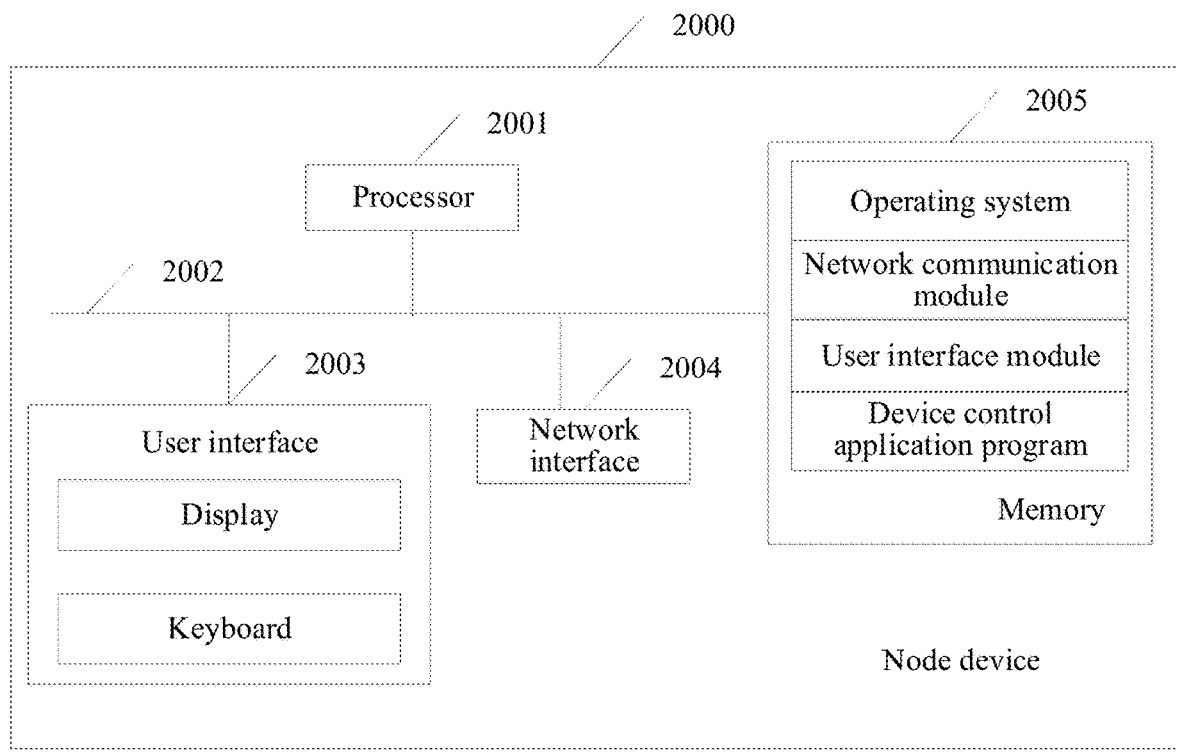
FIG. 13 is a schematic diagram of a node device according to an embodiment of this disclosure.

Further, FIG. 13 is a schematic diagram of a node device according to an embodiment of this disclosure. As shown in FIG. 13, the node device 2000 may include: processing circuitry (for example, at least one processor 2001, e.g., a central processing unit (CPU)), at least one network interface 2004, user interface 2003, memory 2005 (i.e., a non-transitory computer-readable storage medium), and at least one communication bus 2002. The communication bus 2002 is configured to implement connection and communication between these components. The user interface 2003 may include a display and a keyboard. In an embodiment, the network interface 2004 may include a standard wired interface and a standard wireless interface (for example, a Wi-Fi interface). The memory 2005 may be a high-speed RAM, or may be a non-volatile memory, for example, at least one magnetic disk memory. In an embodiment, the memory 2005 may alternatively be at least one storage apparatus located remotely from the processor 2001. As shown in FIG. 13, the memory 2005 used as a computer storage medium may include an operating system, a network communication module, a user interface module, and a device control application program.

In the node device 2000 shown in FIG. 13, the network interface 2004 is mainly configured for communication with a first node via a network; the user interface 2003 is mainly configured to provide an input interface for a user, and the processor 2001 may be configured to invoke the device control application program stored in the memory 2005, to implement: obtaining a hash mapping relationship between first service data information corresponding to a first mode and second service data information corresponding to a second mode, the hash mapping relationship being established by a first node in a first blockchain network on a first blockchain corresponding to the first blockchain network, the first service data information being obtained by the first node from the first blockchain, the first mode being determined by a data structure mode of the first service data information stored in a first block in the first blockchain, and the second service data information being determined by the first node by obtaining the second mode associated with a second block on a second blockchain corresponding to the second blockchain network and converting the first service data information corresponding to the first mode to the second mode; receiving, based on the hash mapping relationship, the second service data information migrated by the first node; and adding the second service data information to a transaction pool associated with the second blockchain, packing the second service data information into a to-be-verified block in the transaction pool, determining, according to the to-be-verified block, a target block to be written to the second blockchain, and writing the target block to the second blockchain.

It is to be understood that the node device 2000 described in the embodiments of this disclosure may implement the descriptions of the cross-blockchain data migration method in the foregoing embodiment corresponding to FIG. 6 and may also implement the descriptions of the cross-blockchain data migration apparatus 2 in the foregoing embodiment corresponding to FIG. 12, and the details will not be repeated here. In addition, the description of beneficial effects of the same method are not described herein again.

In addition, it is to be noted that: an embodiment of this disclosure further provides a computer-readable storage medium. The computer-readable storage medium stores a computer program executed by the cross-blockchain data migration apparatus 2 mentioned above, and the computer program includes program instructions. When executing the program instructions, the processor can implement the descriptions of the cross-blockchain data migration method in the foregoing embodiment corresponding to FIG. 6. Therefore, the details will not be repeated here. In addition, the description of beneficial effects of the same method are not described herein again. For technical details that are not disclosed in the embodiment of the computer-readable storage medium of this disclosure, reference may be made to the descriptions of the method embodiments of this disclosure. By way of example, the program instructions may be deployed to be executed by one computing device, or by a plurality of computing devices located at a same location, or by a plurality of computing devices distributed at a plurality of locations and interconnected via a communication network. The plurality of computing devices distributed at the plurality of locations and interconnected via the communication network can form a blockchain system.

Figure 14:
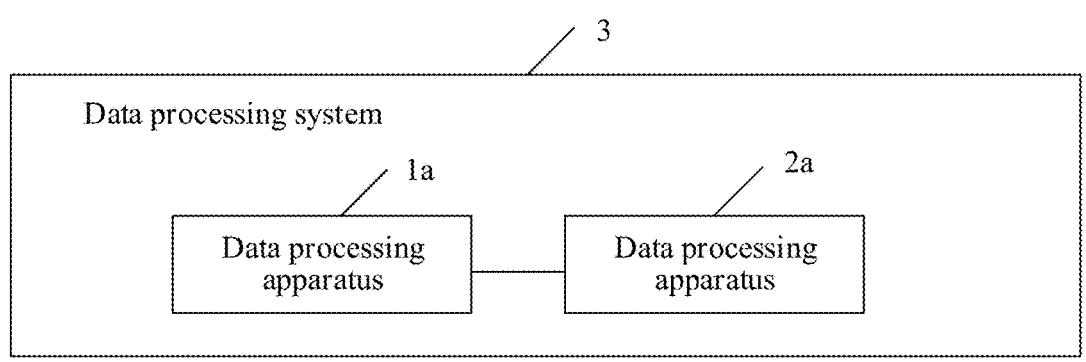
FIG. 14 is a schematic structural diagram of a data processing system according to an embodiment of this disclosure.

Further, FIG. 14 is a schematic structural diagram of a data processing system according to an embodiment of this disclosure. The data processing system 3 may include a data processing apparatus 1*a* and a data processing apparatus 2*a*. The data processing device 1*a* may be the cross-blockchain data migration apparatus 1 in the foregoing embodiment corresponding to FIG. 10. It can be understood that the data processing device 1*a* may be integrated into the node A in the foregoing embodiment corresponding to FIG. 2, so the details will not be described in detail here. The data processing device 2*a* may be the cross-blockchain data migration apparatus 2 in the foregoing embodiment corresponding to FIG. 12. It can be understood that the data processing device 2*a* may be integrated into the node B in the foregoing embodiment corresponding to FIG. 2, so the details will not be described in detail here. In addition, the description of beneficial effects of the same method are not described herein again. For technical details not disclosed in the embodiments of the data processing system involved in this disclosure, refer to the description of the method embodiments of this disclosure.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of this disclosure. Therefore, equivalent variations shall fall within the scope of this disclosure.

What is claimed is:

1. A cross-blockchain data migration method, comprising:
   obtaining, by processing circuitry of a first node in a first blockchain network, from a first blockchain in the first blockchain network, first service data information corresponding to a first data structure mode stored in a first block in the first blockchain;
   obtaining a second data structure mode associated with a second block in a second blockchain corresponding to a second blockchain network based on a second node in the second blockchain network having a network connection relationship with the first node of the first blockchain network, and converting the first service data information to second service data information corresponding to the second data structure mode;
   establishing a hash mapping relationship between a plurality of first hash values associated with the first service data information and a plurality of second hash values associated with the second service data information in the first blockchain, each of the plurality of first hash values being mapped with a respective one of the plurality of second hash values; and
   migrating the second service data information to the second node in the second blockchain network based on the hash mapping relationship.

2. The method according to claim 1, wherein the obtaining the second data structure mode comprises:
   obtaining a data structure mode of service data information in the second block according to the second node having the network connection relationship with the first node;
   using the data structure mode of the service data information in the second block as the second data structure mode; and
   converting the first data structure mode of the first service data information to the second data structure mode, and using the first service data information in the second data structure mode as the second service data information.

3. The method according to claim 2, wherein the first data structure mode is one of Unspent Transaction Outputs (UTXO) mode or an account/balance mode and the second data structure mode is the other one of the Unspent Transaction Outputs (UTXO) mode or the account/balance mode.

4. The method according to claim 1, wherein the establishing comprises:
   obtaining a first hash value, of the plurality of first hash values, corresponding to the first service data information and a second hash value, of the plurality of second hash values. corresponding to the second service data information; and
   creating an initial mapping relationship between the first hash value and the second hash value in the first blockchain, and using the initial mapping relationship as the hash mapping relationship between the first service data information and the second service data information.

5. The method according to claim 1, wherein the migrating comprises:
   obtaining a public key of the second node in the second blockchain network;
   encrypting the second service data information based on the public key to obtain encrypted data information; and
   migrating the encrypted data information to the second node in the second blockchain network based on the hash mapping relationship.

6. The method according to claim 1, wherein, after the migrating, the method further comprises:
   disabling the first blockchain in the first blockchain network, and instructing the first node to enable the second blockchain corresponding to the second blockchain network, wherein the hash mapping relationship between the first service data information and the second service data information exists in the second blockchain.

7. The method according to claim 6, wherein
the first service data information includes target service data information, the target service data information including an account address of a target user corresponding to a user terminal; and the method further comprises:
obtaining an initial data query request sent by the user terminal instructing the first node to find the target service data information in the first blockchain based on the account address;

in response to a determination that the target service data information is not found in the first blockchain, obtaining a hash mapping relationship associated with a hash value of the target service data information; and forwarding a target data query request associated with the account address to the second node based on the hash mapping relationship associated with the hash value of the target service data information, the target data query request instructing the second node to find target service data information that satisfies the hash mapping relationship in the second blockchain based on the account address.

8. A cross-blockchain data migration method, comprising:
obtaining, by processing circuitry of a second node in a second blockchain network, a hash mapping relationship between a plurality of first hash values associated with first service data information corresponding to a first data structure mode and a plurality of second hash values associated with second service data information corresponding to a second data structure mode, each of the plurality of first hash values being mapped with a respective one of the plurality of second hash values, the hash mapping relationship being established by a first node in a first blockchain network in a first blockchain, the second node in the second blockchain network having a network connection relationship with the first node of the first blockchain network, the first service data information being obtained by the first node from the first blockchain, the first data structure mode being determined by a data structure mode of the first service data information stored in a first block in the first blockchain, and the second service data information being determined by the first node by obtaining the second data structure mode associated with a second block in a second blockchain corresponding to the second blockchain network and converting the first service data information corresponding to the first data structure mode to the second data structure mode;

receiving, based on the hash mapping relationship, the second service data information migrated by the first node; and adding the second service data information to a transaction pool associated with the second blockchain, packing the second service data information into a to-be-verified block in the transaction pool, determining, according to the to-be-verified block, a target block to be written to the second blockchain, and writing the target block to the second blockchain.

9. The method according to claim 8, wherein the receiving comprises:
receiving, based on the hash mapping relationship, encrypted data information migrated by the first node, the encrypted data information being obtained by the first node by encrypting the second service data information according to a public key of the second node; and decrypting the encrypted data information based on a private key associated with the public key to obtain the second service data information.

10. The method according to claim 8, wherein the adding comprises:
adding the second service data information to the transaction pool associated with the second blockchain, and packing the second service data information into the to-be-verified block in the transaction pool;

transmitting the to-be-verified block to consensus nodes in the second blockchain network for consensus verification;

obtaining consensus confirmation information returned by the consensus nodes in the second blockchain network; and in response to a determination that a total number of pieces of the consensus confirmation information is greater than a consensus threshold, determining that the consensus verification is successful, determining the to-be-verified block that has passed the consensus verification as the target block, and adding the target block to the second blockchain.

11. The method according to claim 8, wherein
the first service data information includes target service data information;
the target service data information includes an account address of a target user corresponding to a user terminal; and
the method further comprises:
obtaining a target data query request associated with the account address and forwarded by the first node, the target data query request being transmitted by the user terminal to find the target service data information;

using a hash value of the target service data information carried in the target data query request as an initial hash value, and determining a target hash value associated with the initial hash value from the hash mapping relationship;

identifying a block associated with the target hash value in the second blockchain; and obtaining the target service data information from the target block based on the account address.

12. The method according to claim 11, wherein the identifying the block comprises:
obtaining a first root hash value under an authentication path to which the target hash value belongs;

obtaining a root hash value corresponding to each block of the second blockchain;

finding a root hash value that matches the first root hash value among the root hash values of the second blockchain; and using the found root hash value that matches the first root hash value as a second root hash value, and using a block corresponding to the second root hash value as the target block.

13. A cross-blockchain data migration apparatus comprising:
processing circuitry of a first node in a first blockchain network, the processing circuitry being configured to:
obtain, from a first blockchain in the first blockchain network, first service data information corresponding to a first data structure mode stored in a first block in the first blockchain;

obtain a second data structure mode associated with a second block in a second blockchain corresponding to a second blockchain network based on a second node in the second blockchain network having a network connection relationship with the first node of the first blockchain network, and convert the first service data information to second service data information corresponding to the second data structure mode;

establish a hash mapping relationship between a plurality of first hash values associated with the first service data information and a plurality of second hash values associated with the second service data information in the first blockchain, each of the plurality of first hash values being mapped with a respective one of the plurality of second hash values; and migrate the second service data information to the second node in the second blockchain network based on the hash mapping relationship.

14. The apparatus according to claim 13, wherein the processing circuitry is configured to:

obtain a data structure mode of service data information in the second block according to the second node having the network connection relationship with the first node;

use the data structure mode of the service data information in the second block as the second data structure mode; and convert the first data structure mode of the first service data information to the second data structure mode, and use the first service data information in the second data structure mode as the second service data information.

15. The apparatus according to claim 14, wherein the first data structure mode is one of Unspent Transaction Outputs (UTXO) mode or an account/balance mode and the second data structure mode is the other one of the Unspent Transaction Outputs (UTXO) mode or the account/balance mode.

16. The apparatus according to claim 13, wherein the processing circuitry is configured to:

obtain a first hash value, of the plurality of first hash values, corresponding to the first service data information and a second hash value, of the plurality of second hash values, corresponding to the second service data information; and create an initial mapping relationship between the first hash value and the second hash value in the first blockchain, and use the initial mapping relationship as the hash mapping relationship between the first service data information and the second service data information.

17. The apparatus according to claim 13, wherein the processing circuitry is configured to:

obtain a public key of the second node in the second blockchain network;

encrypt the second service data information based on the public key to obtain encrypted data information; and migrate the encrypted data information to the second node in the second blockchain network based on the hash mapping relationship.

18. The apparatus according to claim 13, wherein, after the migration, the processing circuitry is configured to:

disable the first blockchain in the first blockchain network, and instruct the first node to enable the second blockchain corresponding to the second blockchain network, wherein the hash mapping relationship between the first service data information and the second service data information exists in the second blockchain.

19. The apparatus according to claim 18, wherein the first service data information includes target service data information, the target service data information including an account address of a target user corresponding to a user terminal; and the processing circuitry is further configured to:

obtain an initial data query request sent by the user terminal instructing the first node to find the target service data information in the first blockchain based on the account address;

in response to a determination that the target service data information is not found in the first blockchain, obtain a hash mapping relationship associated with a hash value of the target service data information; and forward a target data query request associated with the account address to the second node based on the hash mapping relationship associated with the hash value of the target service data information, the target data query request instructing the second node to find target service data information that satisfies the hash mapping relationship in the second blockchain based on the account address.

20. A non-transitory computer-readable storage medium, storing computer-readable instructions, which, when executed by a processor, cause the processor to execute the method according to claim 8.

* * * * *